United States Patent
Wan et al.

(10) Patent No.: US 10,657,819 B2
(45) Date of Patent: May 19, 2020

(54) EXTERNAL COMMUNICATION FOR VEHICLES

(71) Applicant: Apple Inc., Cupertino, CA (US)

(72) Inventors: Kit-Man Wan, Sunnyvale, CA (US); Lilli I. Jonsson, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 155 days.

(21) Appl. No.: 15/711,705

(22) Filed: Sep. 21, 2017

(65) Prior Publication Data

US 2018/0082587 A1  Mar. 22, 2018

Related U.S. Application Data

(60) Provisional application No. 62/397,424, filed on Sep. 21, 2016.

(51) Int. Cl.
*G08G 1/16* (2006.01)
*B60Q 1/50* (2006.01)
(Continued)

(52) U.S. Cl.
CPC ............... *G08G 1/163* (2013.01); *B60Q 1/50* (2013.01); *B60Q 1/503* (2013.01); *B60Q 5/005* (2013.01);
(Continued)

(58) Field of Classification Search
CPC .......... B60Q 1/50; B60Q 1/503; B60Q 5/005; B60Q 5/006; B60W 30/0953;
(Continued)

(56) References Cited

U.S. PATENT DOCUMENTS

| | | |
|---|---|---|
| 7,095,318 B1 | 8/2006 | Bekhor |
| 8,749,401 B2 | 6/2014 | Hara et al. |

(Continued)

FOREIGN PATENT DOCUMENTS

| | | |
|---|---|---|
| CN | 102387941 A | 3/2012 |
| DE | 102009009473 A1 | 8/2010 |

(Continued)

OTHER PUBLICATIONS

Tucker, Emma, "Google's self-driving cars could use robotic hands and eyes to communicate with pedestrians", https://www.dezeen.com/2015/11/30/google-driverless-self-driving-car-robotic-hands-eyes-to-communicate-object-detection-sensors-patent/, Nov. 30, 2015, downloaded Sep. 11, 2017, 11 pp.

(Continued)

*Primary Examiner* — Yazan A Soofi
(74) *Attorney, Agent, or Firm* — Young Basile Hanlon & MacFarlane, P.C.

(57) ABSTRACT

Methods, apparatuses, and non-transitory computer readable storage media for external vehicle communication are described. A method for external vehicle communication may include determining a vehicular path for a vehicle and an extra-vehicular path for an extra-vehicular object external to the vehicle, the vehicular path based on vehicle state data including a vehicle velocity and a vehicle orientation, the extra-vehicular path based on extra-vehicular state data including an object velocity and an object orientation of the extra-vehicular object; determining when the vehicular path will intercept the extra-vehicular path based on the vehicle state data and the extra-vehicular state data; determining an object identity for the extra-vehicular object and a distance between the vehicle and the extra-vehicular object; and generating at least one external communication based on the object identity when the distance between the vehicle and (Continued)

the extra-vehicular object is less than a predetermined threshold distance.

21 Claims, 10 Drawing Sheets

(51) Int. Cl.
- *B60Q 5/00* (2006.01)
- *B60W 30/095* (2012.01)
- *B60W 50/14* (2020.01)
- *G05D 1/02* (2020.01)
- *G05D 1/00* (2006.01)
- *B60W 30/18* (2012.01)

(52) U.S. Cl.
CPC ......... *B60Q 5/006* (2013.01); *B60W 30/0953* (2013.01); *B60W 30/0956* (2013.01); *B60W 50/14* (2013.01); *G05D 1/0088* (2013.01); *G05D 1/0212* (2013.01); *G05D 1/0276* (2013.01); *G08G 1/166* (2013.01); *B60W 30/18154* (2013.01); *B60W 2050/143* (2013.01); *B60W 2050/146* (2013.01); *G05D 2201/0213* (2013.01)

(58) Field of Classification Search
CPC .............. B60W 30/0956; B60W 50/14; G05D 1/0212; G05D 1/0276; G08G 1/166
USPC .......................................................... 701/23
See application file for complete search history.

(56) References Cited

U.S. PATENT DOCUMENTS

| | | | |
|---|---|---|---|
| 9,196,164 B1 | 11/2015 | Urmson et al. | |
| 9,517,767 B1* | 12/2016 | Kentley | .................. B60R 21/01 |
| 2007/0152804 A1* | 7/2007 | Breed | .................. B60N 2/2863 |
| | | | 340/435 |
| 2009/0160678 A1 | 6/2009 | Turnbull | |
| 2010/0100324 A1* | 4/2010 | Caminiti | ............... G08G 1/0104 |
| | | | 701/301 |
| 2011/0128161 A1 | 6/2011 | Bae et al. | |
| 2011/0190972 A1* | 8/2011 | Timmons | ................ G01C 21/34 |
| | | | 701/31.4 |
| 2011/0199199 A1 | 8/2011 | Perkins | |
| 2013/0016218 A1* | 1/2013 | Asao | ....................... B60Q 5/008 |
| | | | 348/148 |
| 2014/0035740 A1 | 2/2014 | Lettstrom et al. | |
| 2015/0035685 A1* | 2/2015 | Strickland | .............. B60Q 9/008 |
| | | | 340/901 |
| 2015/0091740 A1* | 4/2015 | Bai | ........................ G08B 21/06 |
| | | | 340/901 |
| 2015/0175161 A1* | 6/2015 | Breed | ................... B60W 30/09 |
| | | | 348/148 |
| 2015/0210217 A1* | 7/2015 | Taylor | ................. B60C 23/0408 |
| | | | 342/55 |
| 2017/0120814 A1* | 5/2017 | Kentley | ................ G10K 11/346 |
| 2017/0120904 A1* | 5/2017 | Kentley | ................. G01C 21/32 |
| 2017/0222612 A1* | 8/2017 | Zollner | .................. G08G 1/167 |
| 2018/0326982 A1* | 11/2018 | Paris | ................. B60W 30/0956 |

FOREIGN PATENT DOCUMENTS

| | | |
|---|---|---|
| DE | 102011012793 A1 | 9/2012 |
| DE | 102013004834 A1 | 9/2014 |
| DE | 102015011212 A1 | 3/2016 |
| DE | 102014226188 A1 | 6/2016 |
| JP | 2005332297 A | 12/2005 |
| WO | 2015126318 A1 | 8/2015 |

OTHER PUBLICATIONS

Reid, Carlton, "Makers of driverless cars want cyclists and pedestrians off the roads", http://www.bikebiz.com/news/read/makers-of-driverless-cars-want-cyclists-and-pedestrians-off-the-roads/018934#after-ad, Jan. 20, 2016, Downloaded Sep. 11, 2017, 1 p.

* cited by examiner

EXTERNAL COMMUNICATION FOR VEHICLES

CROSS-REFERENCE TO RELATED APPLICATIONS

This application claims the benefit of U.S. Provisional Application No. 62/397,424, filed on Sep. 21, 2016, entitled "External Communication for Vehicles," the content of which is incorporated by reference in its entirety for all purposes.

TECHNICAL FIELD

This disclosure relates to the operation of a vehicle, including communicating the forthcoming actions of an autonomous vehicle.

BACKGROUND

In a vehicle operated by a human driver, the driver's intentions may be conveyed to other individuals, such as other drivers and pedestrians, through a combination of driver-directed vehicular signals (e.g., horn, turn indicator, flashing headlights) and physical signals such as hand gestures or eye contact. However, in a semi- or fully-autonomous vehicle, in which the driver's attention may not be fully engaged in the operation of the vehicle, other vehicles and pedestrians may lack awareness of the intended actions of the autonomous vehicle.

SUMMARY

An aspect of the disclosed embodiments is a method for external vehicle communication. The method includes determining, by a processor, a vehicular path for a vehicle and an extra-vehicular path for an extra-vehicular object external to the vehicle, the vehicular path based on vehicle state data including a vehicle velocity and a vehicle orientation, the extra-vehicular path based on extra-vehicular state data including an object velocity and an object orientation of the extra-vehicular object. In response to a determination, by the processor, that the vehicular path will intercept the extra-vehicular path, the processor determines an object identity for the extra-vehicular object and a distance between the vehicle and the extra-vehicular object. The determination that the vehicular path will intercept the extra-vehicular path is based on the vehicle state data and the extra-vehicular state data. The object identity is based on the extra-vehicular state data. The method further includes generating, by the processor, at least one external communication based on the object identity when the distance between the vehicle and the extra-vehicular object is less than a predetermined threshold distance.

Another aspect of the disclosed embodiments is another method for external vehicle communication. The method includes determining, by a processor, extra-vehicular paths for at least two extra-vehicular objects external to a vehicle, each extra-vehicular path based on extra-vehicular state data including an object identity, an object velocity, and an object orientation for a respective extra-vehicular object. In response to a determination, by the processor, that the two extra-vehicular objects will intersect, the processor determines object identities and a distance between the two extra-vehicular objects. The determination that the two extra-vehicular objects will intersect is based on the extra-vehicular state data. The object identities are based on the extra-vehicular state data. The method further includes generating, by the processor, at least one external communication, based on the extra-vehicular state data, when the proximity is less than a predetermined threshold distance.

Another aspect of the disclosed embodiments is an external communication apparatus which may include a controller apparatus. The apparatus includes: a sensor configured to detect motion, light, or sound; a communication component configured to generate external communication; and a memory and a processor configured to execute instructions stored in the memory. The apparatus determines a vehicular path for a vehicle and an extra-vehicular path for an extra-vehicular object external to the vehicle, the vehicular path based on vehicle state data including a vehicle velocity and a vehicle orientation, the extra-vehicular path based on extra-vehicular state data including an object velocity and an object orientation of the extra-vehicular object. In response to a determination that the vehicular path will intercept the extra-vehicular path, the apparatus determines an object identity for the extra-vehicular object and a distance between the vehicle and the extra-vehicular object. The determination that the vehicular path will intercept the extra-vehicular path is based on the vehicle state data and the extra-vehicular state data. The object identity is based on the extra-vehicular state data. Further, the apparatus generates at least one external communication based on the object identity when the distance between the vehicle and the extra-vehicular object is less than a predetermined threshold distance.

Another aspect of the disclosed embodiments is a non-transitory computer-readable storage medium including program instructions executable by one or more processors that, when executed, cause the one or more processors to perform operations. The operations include: determining a vehicular path for a vehicle and an extra-vehicular path for an extra-vehicular object external to the vehicle, the vehicular path based on vehicle state data including a vehicle velocity and a vehicle orientation, the extra-vehicular path based on extra-vehicular state data including an object velocity and an object orientation of the extra-vehicular object. In response to an operation that determines that the vehicular path will intercept the extra-vehicular path an operation determines an object identity for the extra-vehicular object and a distance between the vehicle and the extra-vehicular object. The determination that the vehicular path will intercept the extra-vehicular path is based on the vehicle state data and the extra-vehicular state data. The object identity is based on the extra-vehicular state data. The operations further include generating at least one external communication based on the object identity when the distance between the vehicle and the extra-vehicular object is less than a predetermined threshold distance.

Another aspect of the disclosed embodiments is a non-transitory computer-readable storage medium including program instructions executable by one or more processors that, when executed, cause the one or more processors to perform operations. The operations include: determining, by a processor, extra-vehicular paths for at least two extra-vehicular objects external to a vehicle, each extra-vehicular path based on extra-vehicular state data including an object identity, an object velocity, and an object orientation for a respective extra-vehicular object; responsive to determining, by the processor, based on the extra-vehicular state data, that two of the extra-vehicular paths intersect, determining, by the processor, object identities and a distance between the two extra-vehicular objects corresponding to the two extra-vehicular paths that will intersect, wherein the object identities are based on the extra-vehicular state data; and generating, by the processor, at least one external communication, based on the extra-vehicular state data, when the distance between the two extra-vehicular objects is less than a predetermined threshold distance.

Another aspect of the disclosed embodiments is an external communication apparatus which may include a controller apparatus. The apparatus includes: a sensor configured to detect motion, light, or sound; a communication component configured to generate external communication; and a memory and a processor configured to execute instructions stored in the memory. The apparatus determines extra-vehicular paths for at least two extra-vehicular objects external to a vehicle, each extra-vehicular path based on extra-vehicular state data including an object identity, an object velocity, and an object orientation for a respective extra-vehicular object. Responsive to determining based on the extra-vehicular state data, that two of the extra-vehicular paths intersect, the apparatus determines, object identities and a distance between the two extra-vehicular objects corresponding to the two extra-vehicular paths that will intersect, wherein the object identities are based on the extra-vehicular state data. The apparatus generates at least one external communication, based on the extra-vehicular state data, when the distance between the two extra-vehicular objects is less than a predetermined threshold distance.

BRIEF DESCRIPTION OF THE DRAWINGS

The disclosure is best understood from the following detailed description when read in conjunction with the accompanying drawings.

DETAILED DESCRIPTION

In the course of travelling from a point of origin to a destination in a vehicle transportation network, the driving intention of other vehicles may be useful information. In a decision-making layer of an autonomous vehicle or an infrastructure in the road, the determination of a driving intention may aid in making informed decisions. For example, to better anticipate the actions of a vehicle, an indication of vehicle intent may result in more efficient movement of vehicles through the vehicle transportation network.

An external communication apparatus may indicate, to other drivers and pedestrians, the intended actions of the vehicle. In this way, that is, by improving communication between vehicles, disruptions in the flow of vehicles through the vehicle transportation network may be decreased. Additionally, generating prompts and timely signals of vehicular intention may enhance vehicle performance by reducing the number of sudden stops, slowdowns, and accelerations that waste fuel and result in undue wear and tear on the vehicle.

Figure 1:
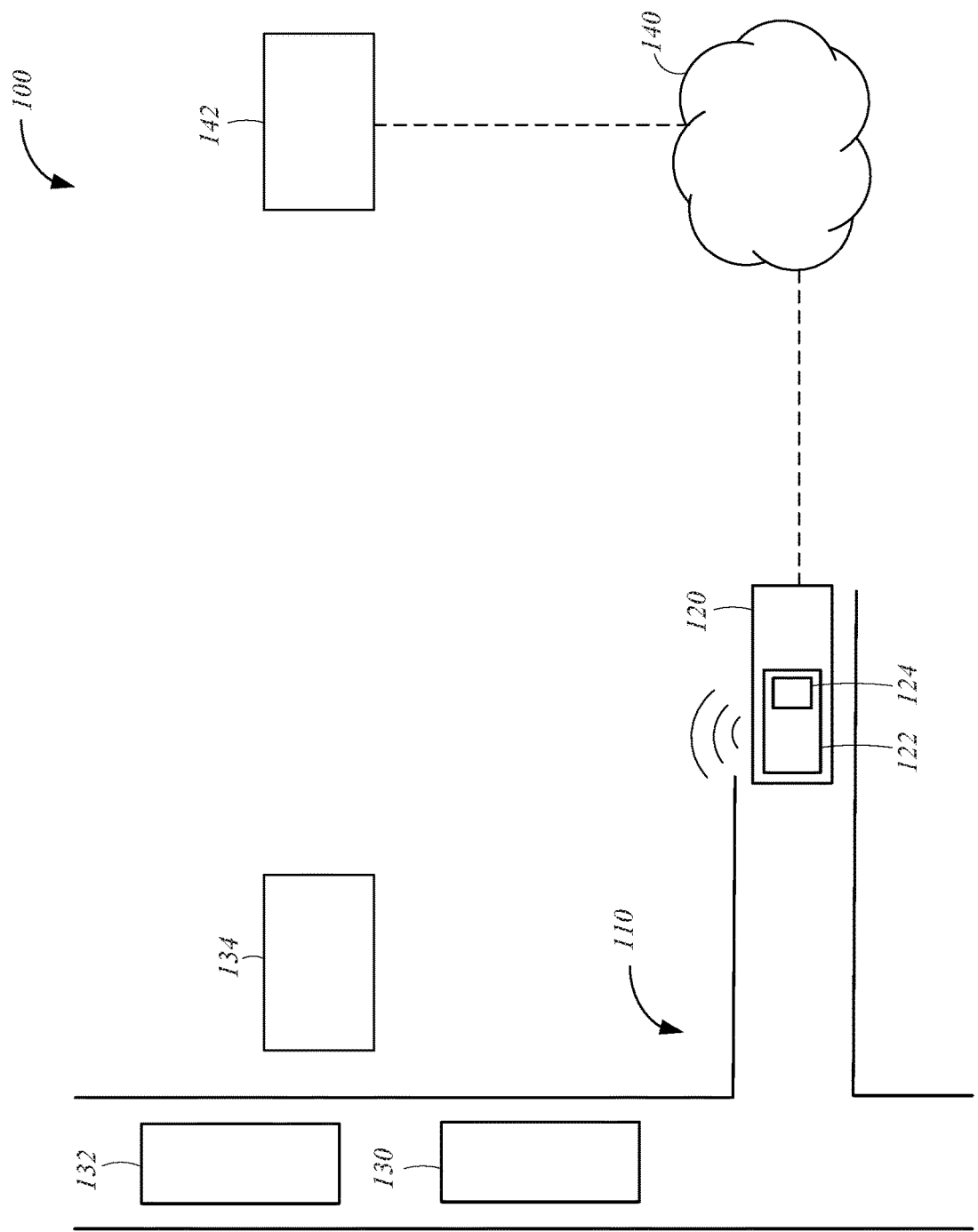
FIG. 1 is a diagram illustrating vehicles and extra-vehicular objects in a transportation system.

FIG. 1 illustrates a transportation system 100 that includes a vehicle transportation network 110 and a vehicle 120. The vehicle transportation network 110 may include paths, routes, roads, streets, highways, thoroughfares, railways, bridges, overpasses, or any surface that may be traversed by a vehicle such as the vehicle 120. In some embodiments, the vehicle 120 may be autonomous or self-driving and may include a controller apparatus 122 that may incorporate or be associated with a sensor 124.

The sensor 124 may generate sensor data by detecting the presence, state, or condition of a portion of the transportation system 100 including the vehicle transportation network 110, the vehicle 120, or extra-vehicular objects such as a vehicle 130, a vehicle 132, or a building 134. As an example, the sensor 124 may include sensors such as an accelerometer, a gyroscope, a still image camera, a video camera, an infrared sensor, a light detection and ranging (LIDAR) system, a radar system, a sonar system, a thermometer, a barometer, a moisture sensor, a vibration sensor, a capacitive input sensor, or a resistive input sensor. Further, the controller apparatus 122 may generate external communications (not shown) directed at extra-vehicular objects including external communications based on the sensor data from the sensor 124.

The transportation system 100 may include one or more of a communication network 140 which is used for communicating data or any type of electronic signal communicated between one or more computing devices. As an example, the communication network 140 may include a local area network (LAN), a wide area network (WAN), a storage area network (SAN), a virtual private network (VPN), a cellular telephone network, or the Internet. The communication network 140 may transmit or receive data using a communication protocol such as transmission control protocol (TCP), user Datagram protocol (UDP), Internet protocol (IP), real-time transport protocol (RTP), or hypertext transport protocol (HTTP).

The controller apparatus 122 may exchange data with a remote computing system 142 via the communication network 140. The remote computing system 142 may include computing devices such as server computing devices and client computing devices, and each of the computing devices may include a processor, a memory, and a communication interface that may be used to exchange data through the communication network 140. As an example, the remote computing system 142 may operate via wire or wirelessly, be terrestrially based (e.g. in a cellular tower) or non-terrestrially based (e.g. in an orbiting satellite), and may include one or more network access devices such as a router, a hub, a relay, or a switch. In an implementation, the remote computing system 142 may store data, such as geolocation data, which may be exchanged with the controller apparatus 122 of the vehicle 120.

Figure 2:
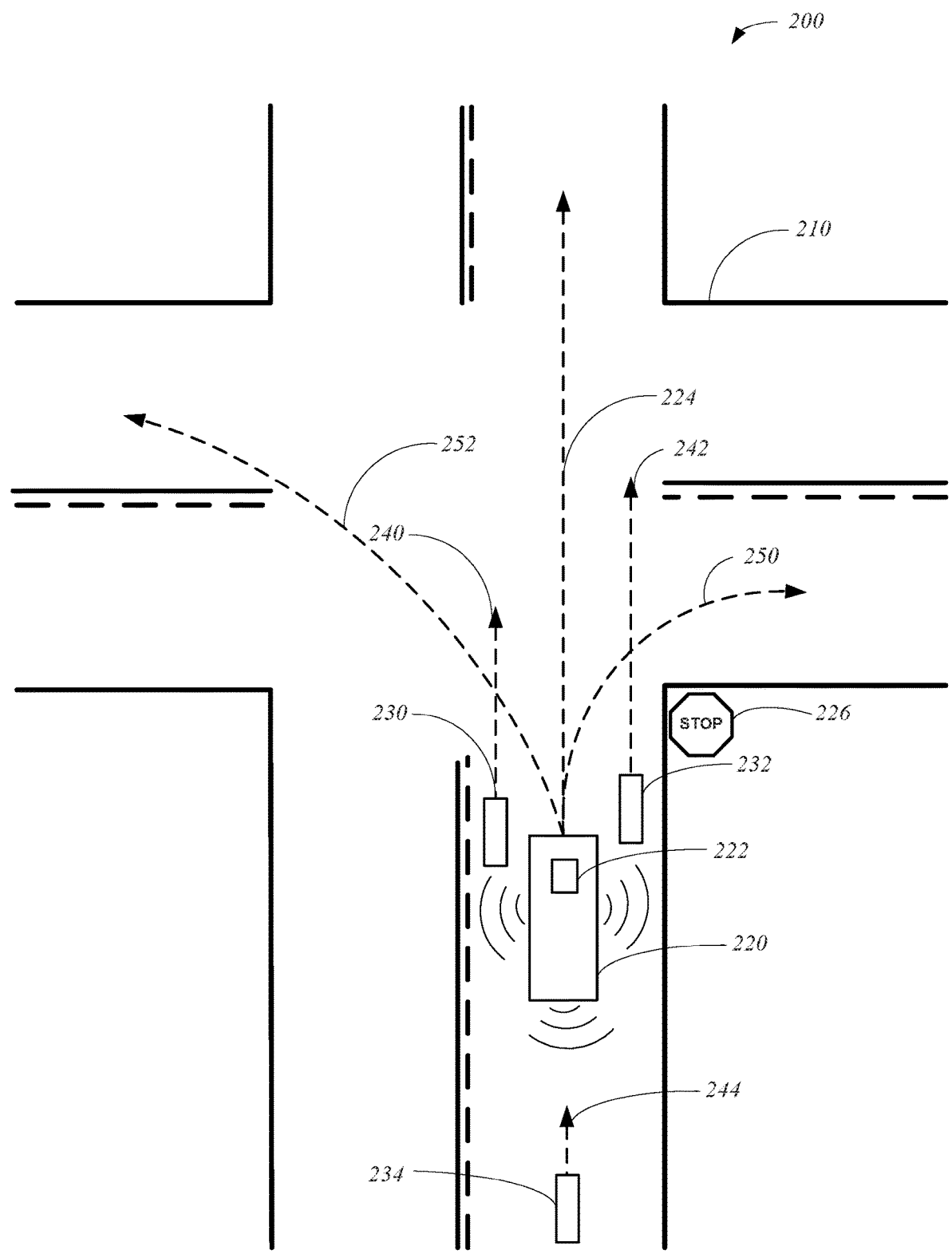
FIG. 2 is a diagram illustrating a controller apparatus generating an external communication for extra-vehicular objects in a transportation system.

FIG. 2 is a diagram illustrating an example of a method for external vehicle communication in an environment 200. In some embodiments, the environment 200 may include a roadway 210 that is traversed by a vehicle 220 which may include a controller apparatus 222 that includes some or all of the features of the controller apparatus 122 illustrated in FIG. 1. In this example, the vehicle 220 may initially be travelling in a direction of path 224 (indicated in dotted line) and will come to a stop beside a stop sign 226. Based on sensor data received from sensors (not shown) associated with the vehicle 220, the controller apparatus 222 detects the presence of a vehicle 230 to the left of the vehicle 220, a vehicle 232 to the right of the vehicle 220, and a vehicle 234 behind the vehicle 220. As an example, the vehicles 230, 232, 234 may include vehicles such as motorcycles or bicycles.

While in motion, the controller apparatus 222 determines distances between the vehicle 220 and each of the vehicles 230, 232, 234. Based on the respective distances between the vehicle 220 and the vehicles 230, 232, 234, the controller apparatus 222 generates an external communication when the controller apparatus 222 determines that a path 240 of the vehicle 230, a path 242 of the vehicle 232, or a path 244 of the vehicle 234 will intersect one of the path 224, a path 250, or a path 252 of the vehicle 220, or that one or more of the distances between the vehicle 220 and the vehicles 230, 232, 234 is less than a threshold distance.

As an example, the external communication may include an audible communication such as "moving vehicle on your right" that may be directed at the vehicle 230 if the path 240 of the vehicle 230 will intercept the path 252 of the vehicle 220 during a left-hand turn of the vehicle 220. The vehicle 220 may include multiple externally visible displays or multiple external speakers (not shown) on various sides or portions of the vehicle 220. As such, the external communication by the vehicle 220 may be accompanied by a visual communication such as a blinking light or the written message "attention, moving vehicle on your right," that may be displayed on one or more of the externally visible displays on the vehicle 220. The audible communications emitted by the multiple external speakers or the visual communications displayed on the externally visible displays may be directed towards an external object such as a vehicle or pedestrian that is on the same side as the speaker or display.

Responsive to one of the vehicles 230, 232, 234 continuing on one of the paths 240, 242, 244 that will intercept one of the paths 224, 250, 252 of the vehicle 220, the controller apparatus 222 may reduce the velocity of the vehicle 220 so that the vehicle 220 does not intercept the path 240 of the vehicle 230, the path 242 of the vehicle 232, or the path 244 of the vehicle 234. To indicate that the vehicle 220 is yielding, the controller apparatus 222 may generate an audible communication such as "yielding" or generate a visual communication, "yielding," that may be displayed on one of the externally visible displays on the vehicle 220.

As the vehicle 220 approaches the traffic intersection and decelerates in order to come to a stop beside the stop sign 226, the controller apparatus 222 may generate an audible communication such as "vehicle slowing down" to indicate the reduction in the velocity of the vehicle 220. In another example, to indicate a reduction in the velocity of the vehicle 220, the controller apparatus 222 may generate a visual indication, such as the written message "vehicle slowing down," or a real-time display of the vehicle velocity, such as an indication of kilometers per hour, on one of the externally visible displays on the vehicle 220.

Within a predetermined distance of the stop sign 226 or after the vehicle 220 comes to a stop beside the stop sign 226, the controller apparatus 222 may generate an audible communication such as "I see you" that is provided from one of the loudspeakers facing one of the vehicles 230, 232, 234. The controller apparatus 222 may also generate an audible communication, "stopping," in advance of the vehicle 220 coming to a stop. In this way, the controller apparatus 222 provides advance notice to one or more of the vehicles 230, 232, 234 that the vehicle 220 will be coming to a stop.

As illustrated in FIG. 2, the vehicle 220 may proceed straight ahead along the path 224, right along the path 250, or left along the path 252. In an example, before proceeding straight ahead along the path 224, the controller apparatus 222 may generate an audible communication, "ready to move" or "ready to move straight ahead" to indicate that movement by the vehicle 220 is imminent and before accelerating along the path 224. In another example, before proceeding right along the path 250, the controller apparatus 222 may provide an audible communication, "right turn," before initiating the right turn. In another example, before proceeding left along the path 252, the vehicle 220 may detect that the vehicle 230 is lingering and may provide an audible communication, "I want space," to indicate to the vehicle 230 that the vehicle 220 requests space before turning left along the path 252.

Figure 3:
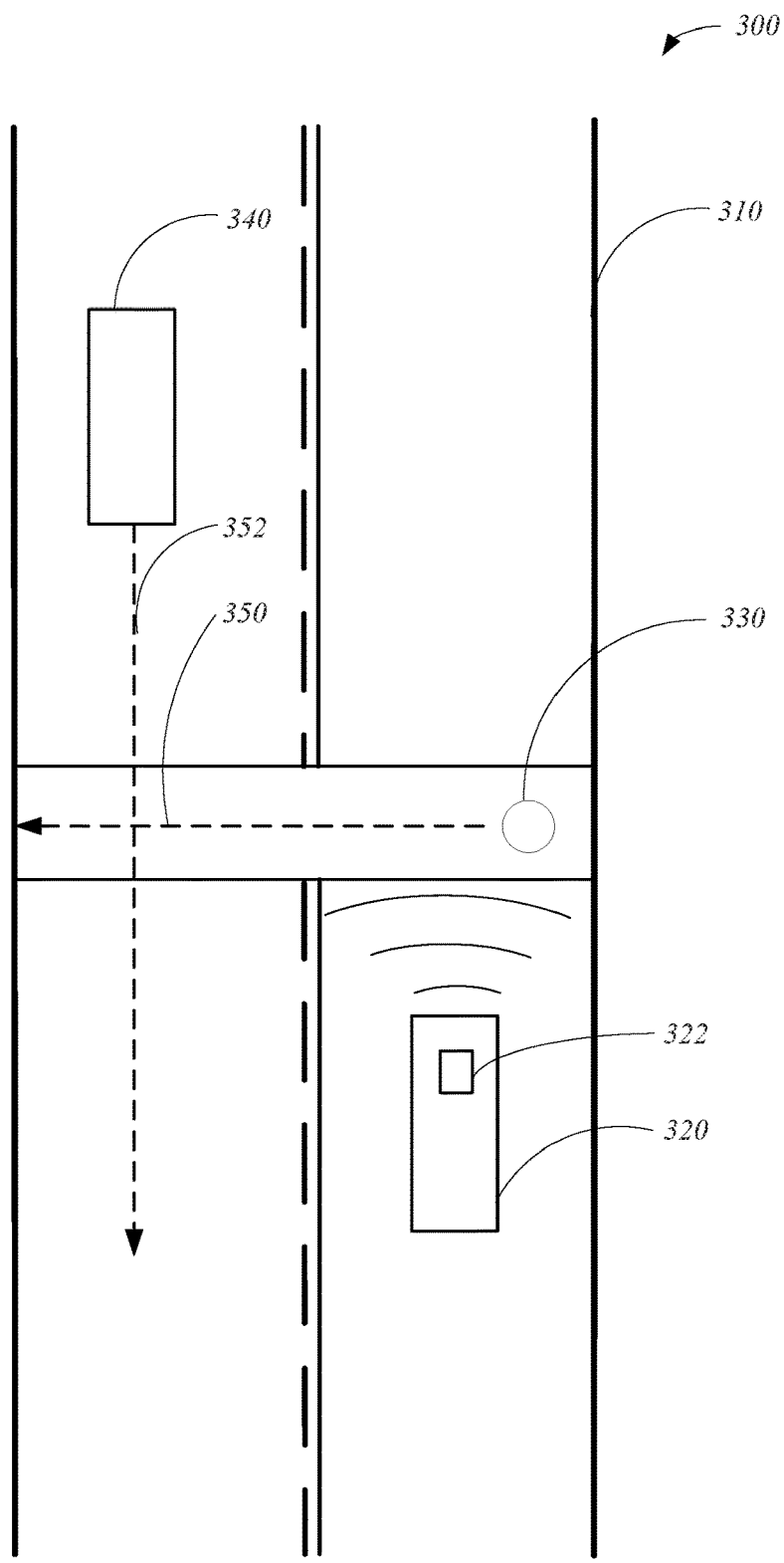
FIG. 3 is a diagram illustrating a controller apparatus generating an external communication for an extra-vehicular object that may intercept another extra-vehicular object.

FIG. 3 is a diagram illustrating an example of a method for external vehicle communication in an environment 300. In some embodiments, the environment 300 may include a roadway 310 that is traversed by a vehicle 320 which may include a controller apparatus 322 that includes some or all of the features of the controller apparatus 122 illustrated in FIG. 1. In this example, the vehicle 320 has come to a stop on the roadway 310 in order to permit the passage of a pedestrian 330 who has been detected by sensors associated with the vehicle 320, such as the sensor 124 illustrated in FIG. 1. Based on the sensors detecting both the pedestrian 330 and a vehicle 340, the controller apparatus 322 may determine that a pedestrian path 350 and a vehicle path 352 intersect and that the vehicle 340 may intercept the pedestrian 330 within, for example, four seconds.

Responsive to the determination that the pedestrian path 350 intersects the vehicle path 352, the controller apparatus 322 may generate an external communication, directed towards the pedestrian 330, in the form of an audible communication that the vehicle 340 is approaching from the right of the pedestrian 330. The controller apparatus 322 may also generate a visual communication such as a flashing light in order to attract the attention of a driver in the vehicle 340 so that the driver of the vehicle 340 is apprised of the presence of the vehicle 320 and of the pedestrian 330.

Figure 4:
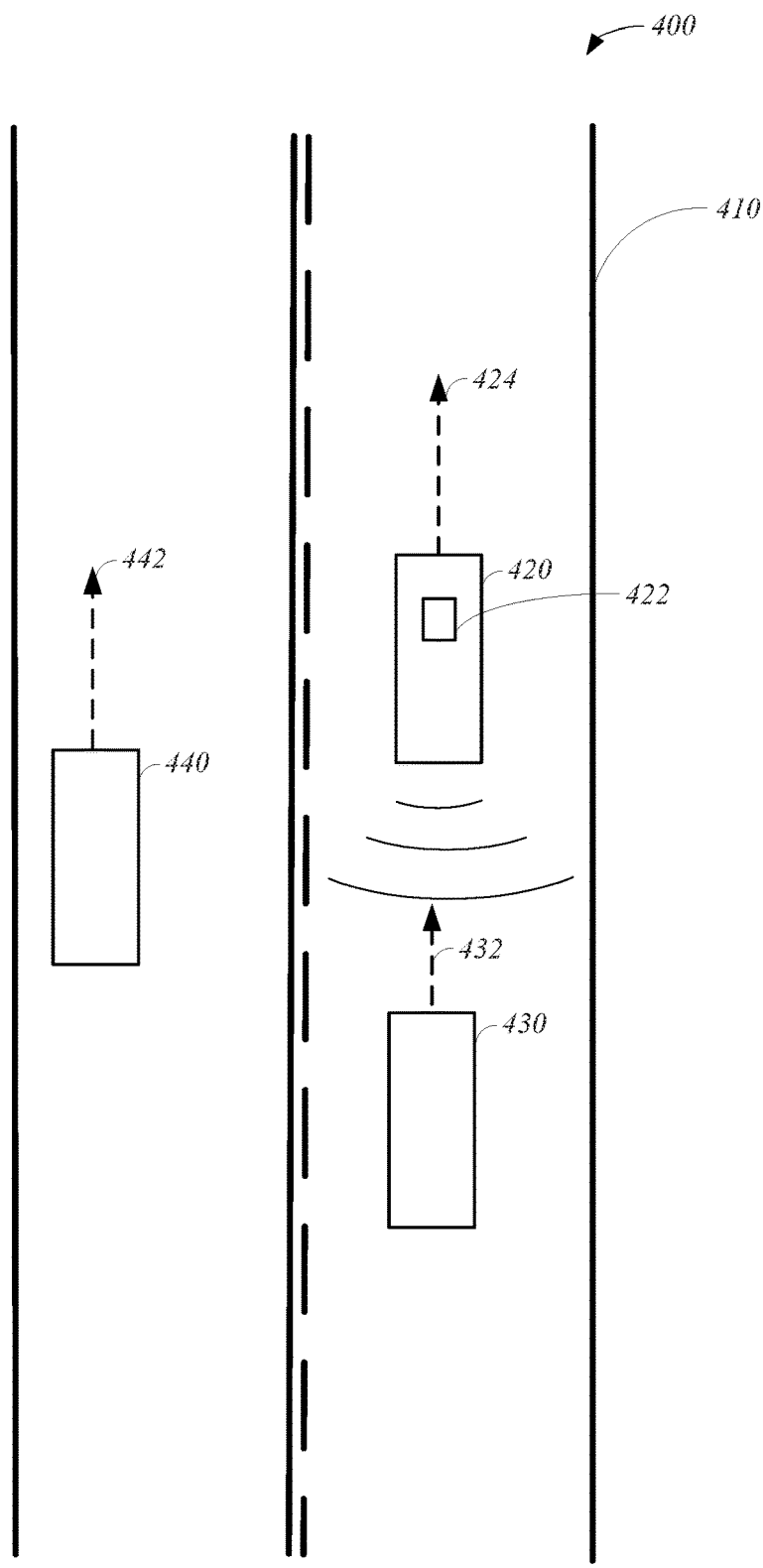
FIG. 4 is a diagram illustrating a controller apparatus generating an external communication for an extra-vehicular object that may intercept a vehicle associated with the controller apparatus.

FIG. 4 is a diagram illustrating an example of a method for external vehicle communication in an environment 400. In some embodiments, the environment 400 may include a roadway 410 that is traversed by a vehicle 420 which may include a controller apparatus 422 that includes some or all of the features of the controller apparatus 122 illustrated in FIG. 1. In this example, the vehicle 420 is proceeding on a path 424. The controller apparatus 422 detects a vehicle 430 proceeding along a path 432 at a velocity of sixty kilometers per hour. Given the common trajectories of the path 424 and the path 432, the controller apparatus 422 determines that the vehicle 430 will intercept the vehicle 420 if the vehicle 430 does not significantly reduce its velocity in the next four seconds. In response to the determination, the controller apparatus 422 generates an external communication in the form of a visual communication, e.g. a flashing light, and an audible communication, e.g. a siren, in order to indicate to the vehicle 430 that the vehicle 420 is in its path 432. As an example, the controller apparatus 422 may also generate an external communication that is directed towards a vehicle 440 that is travelling along a path 442. The external communication to the vehicle 440 may include a visual communication such as a message, displayed on a display portion (not shown) of the vehicle 420 visible to the vehicle 440, indicating that the vehicle 430 is approaching from the rear.

Figure 5:
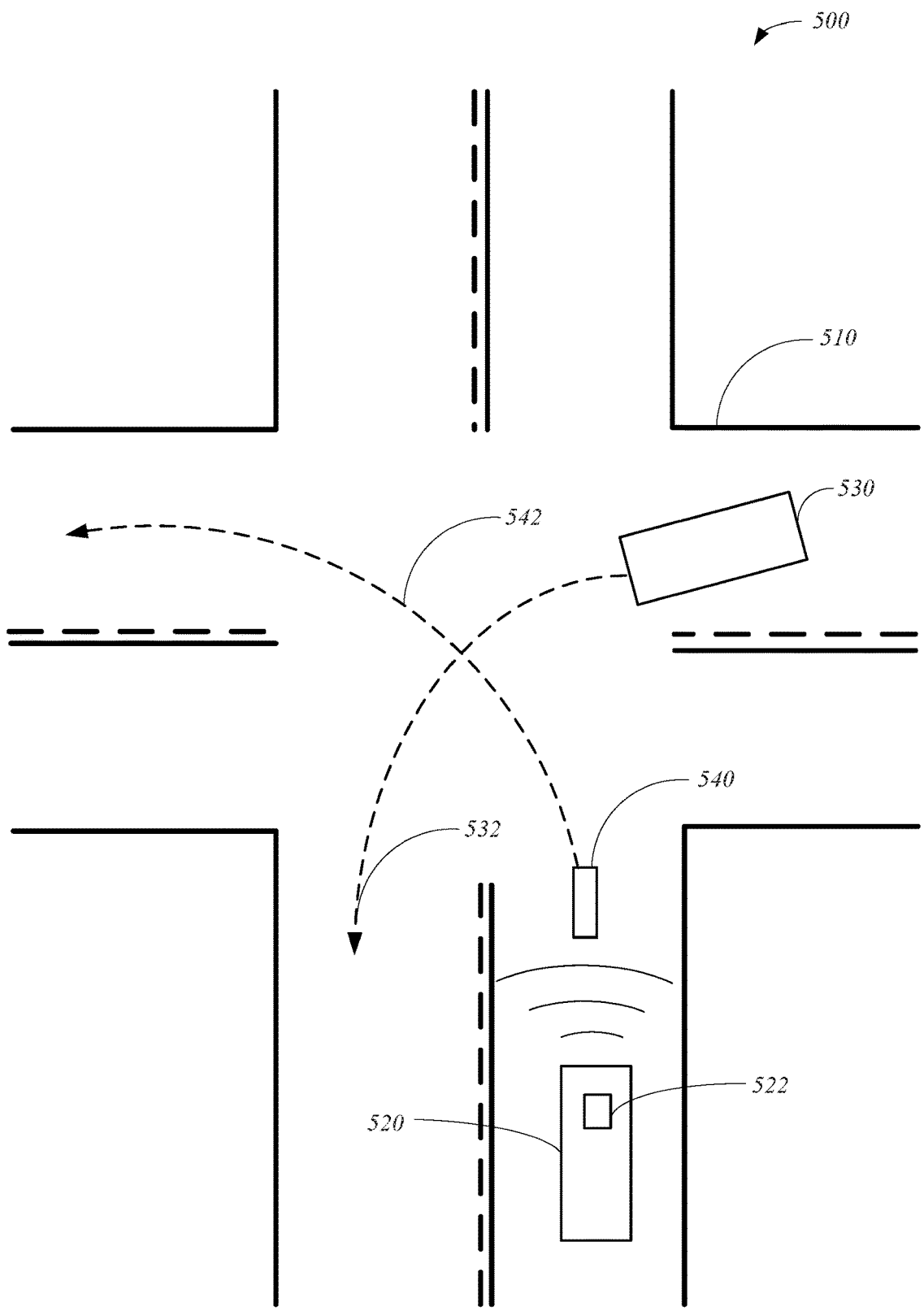
FIG. 5 is a diagram illustrating a controller apparatus generating an external communication for an extra-vehicular object that may intercept another extra-vehicular object.

FIG. 5 is a diagram illustrating an example of a method for external vehicle communication in an environment 500. In some embodiments, the environment 500 may include a roadway 510 that is traversed by a vehicle 520 which may include a controller apparatus 522 that includes some or all of the features of the controller apparatus 122 illustrated in FIG. 1. In this example, the vehicle 520 is in transit on the roadway 510 and the controller apparatus 522 determines, based on sensor data from sensors such as the sensor 124 illustrated in FIG. 1, that a vehicle 530 is proceeding along a path 532 and that a vehicle 540 is proceeding along a path 542.

As an example, the vehicle 540 is a bicycle ridden by a cyclist, and the controller apparatus 522 is able to determine the intended path of the vehicle 540 based on a left turn hand gesture provided by the cyclist, the orientation of the vehicle 540, and the velocity of the vehicle 540, all of which indicate movement along the path 542. In this example, the controller apparatus 522 determines that the path 532 for the vehicle 530 and the path 542 for the vehicle 540 intersect and that the vehicle 540 may intercept the vehicle 530 in two seconds.

Before the vehicle 530 intercepts the vehicle 540, the controller apparatus 522 may generate an audible communication such as "vehicle approaching" that is directed towards the vehicle 540. In the event that the vehicle 540 does not alter its path 542 so as to avoid intercepting the vehicle 530, the controller apparatus 522 may increase the magnitude of the audible communication by increasing the volume from a speaker (not shown). In another example, the controller apparatus 522 may increase the frequency of the audible communication by repeating the audible communication or generating different external communications at a greater rate. Further, the controller apparatus 522 may change the tenor of the audible communication by generating a stronger indication such as "attention, vehicle approaching from the right" to the cyclist on the vehicle 540.

Figure 6:
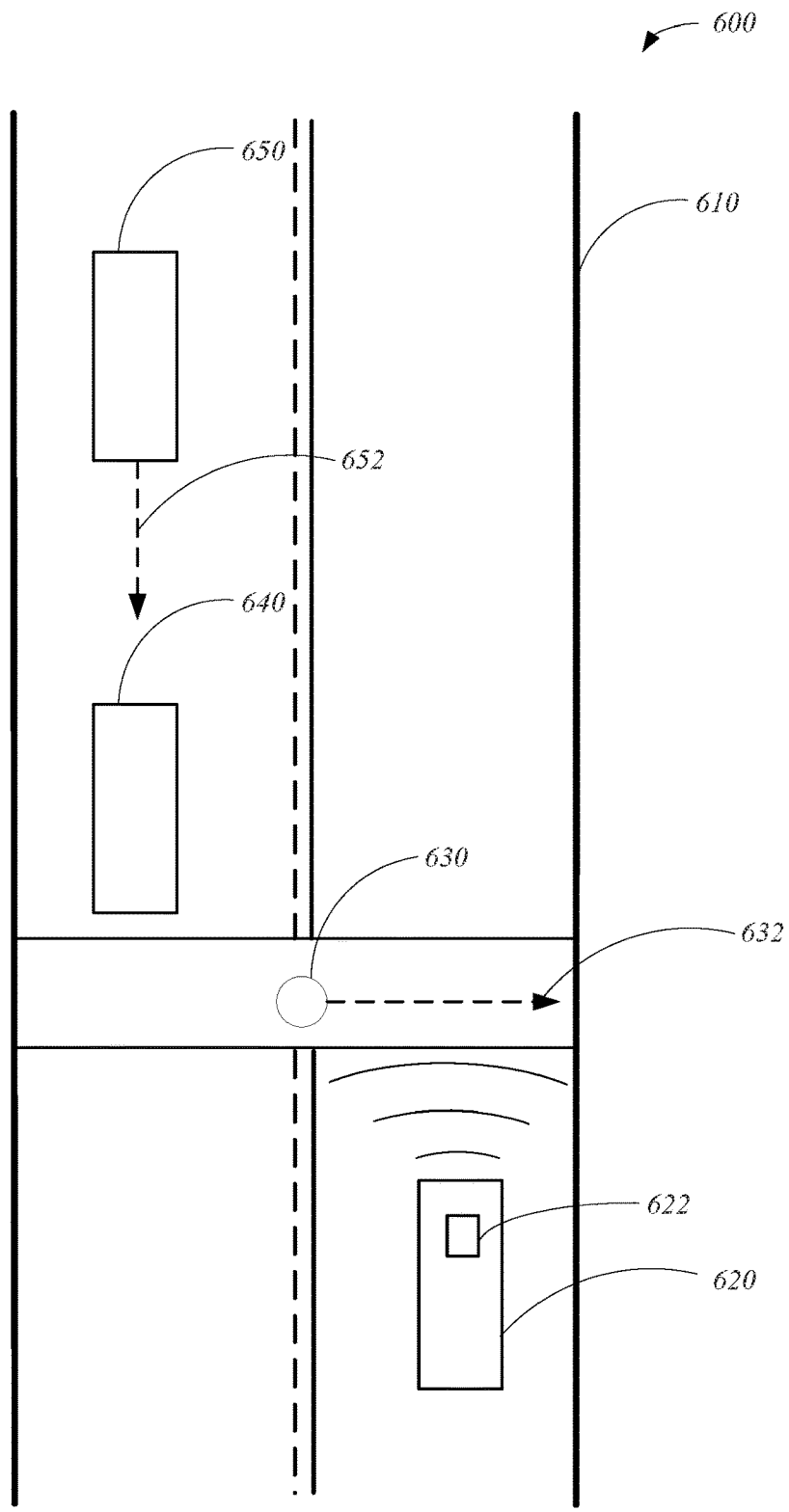
FIG. 6 is a diagram illustrating a controller apparatus generating an external communication for an extra-vehicular object based on a potentially intersecting path with another extra-vehicular object.

FIG. 6 is a diagram illustrating an example of a method for external vehicle communication in an environment 600. In some embodiments, the environment 600 may include a roadway 610 that is traversed by a vehicle 620 which may include a controller apparatus 622 that includes some or all of the features of the controller apparatus 122 illustrated in FIG. 1. In this example, the vehicle 620 is stopped on the roadway 610 to permit the passage of a pedestrian 630 proceeding along a path 632. The pedestrian 630 has been detected by sensors associated with the vehicle 620, such as the sensor 124 illustrated in FIG. 1.

The sensors in the vehicle 620 may also detect a vehicle 640, which has stopped to permit the passage of the pedestrian 630, and a vehicle 650, which is moving along a path 652. Based on the sensor data from the sensors, the controller apparatus 622 may determine a velocity of an extra-vehicular object such as the vehicle 650. The velocity of the extra-vehicular object may then be used as a factor in determining an external communication by the vehicle 620.

In some embodiments, the controller apparatus 622 may determine a wide range of velocities for extra-vehicular objects from stationary (e.g. zero kilometers per hour) to high velocity (e.g. greater than one hundred kilometers per hour). As an example, the controller apparatus 622 may determine the velocity of one or more of an extra-vehicular object including: a pedestrian who may walk or run at low velocities such as a velocity at or below fifteen kilometers per hour; a cyclist who may cycle at intermediate velocities such as a velocity at or below forty kilometers per hour; or a motor vehicle that may move at velocities including low or intermediate velocities as well as greater velocities exceeding forty kilometers per hour.

As an example, the controller apparatus 622 may determine that the vehicle 650 is moving at a high velocity (e.g., 100 kilometers per hour), that by continuing on the path 652, the vehicle 650 will intercept the vehicle 640 in two seconds, and that the vehicle 650 is travelling at too high of a velocity to avoid intercepting the vehicle 640 without redirecting its path 652 to the right or to the left of the vehicle 640. The controller apparatus 622 may also determine that if the vehicle 650 redirects its path 652 around the vehicle 640, the vehicle 650 may intercept the pedestrian 630.

Based on the potential intersecting path of the vehicle 650 and the pedestrian 630, the controller apparatus 622 may provide an external communication to the pedestrian 630, such as an audible communication that informs the pedestrian 630 that the vehicle 650 is approaching at a high velocity. The controller apparatus 622 may also generate an external communication in the form of a visual communication such as flashing lights or displaying a message, on a display component (not shown) of the vehicle 620, that the vehicle 650 is approaching at a high velocity.

Figure 7:
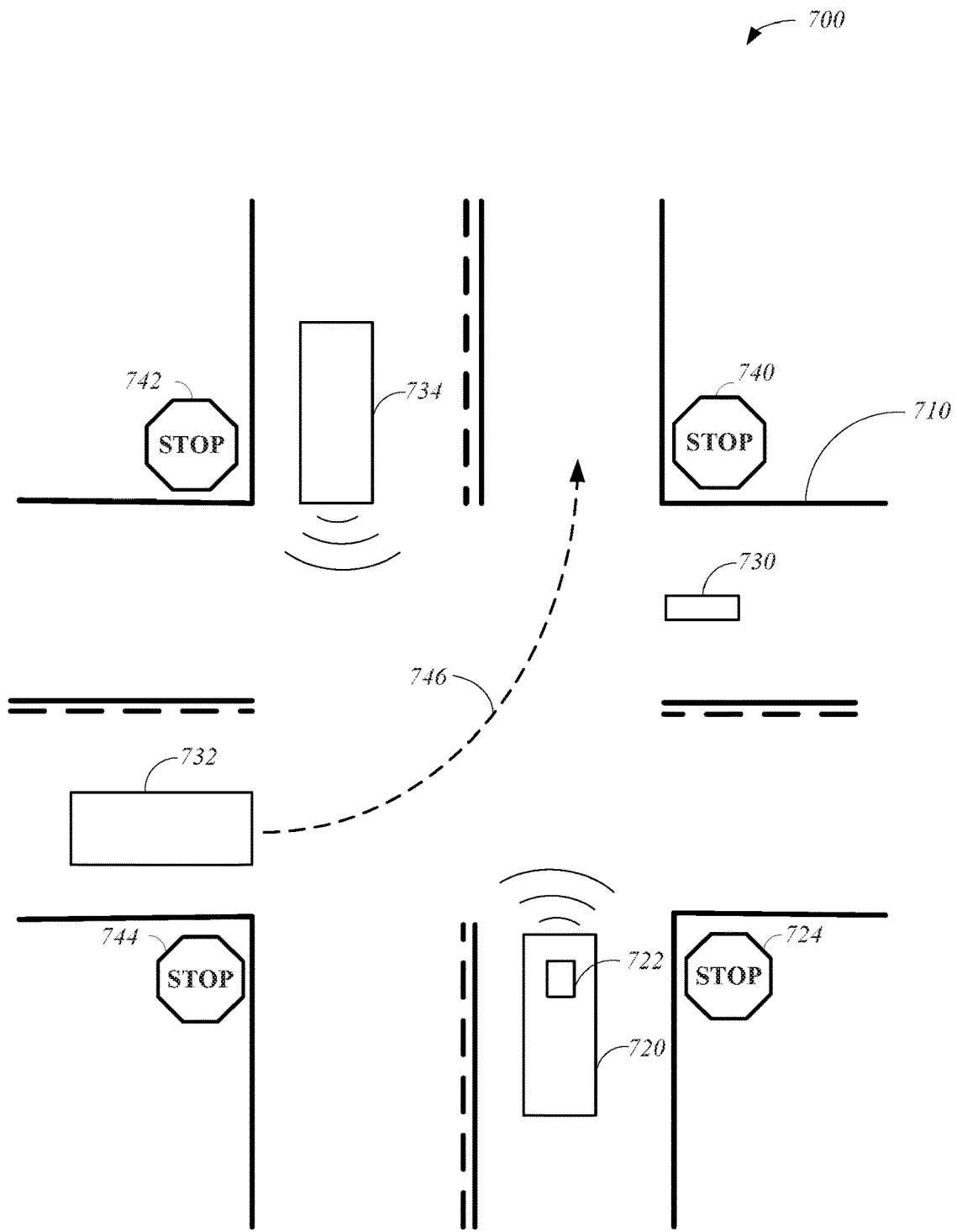
FIG. 7 is a diagram illustrating a controller apparatus generating an external communication for an extra-vehicular object based on the extra-vehicular object's predicted proximity to another extra-vehicular object.

FIG. 7 is a diagram illustrating an example of a method for external vehicle communication in an environment 700. In some embodiments, the environment 700 may include a roadway 710 that is traversed by a vehicle 720 which may include a controller apparatus 722 that includes some or all of the features of the controller apparatus 122 illustrated in FIG. 1. In this example, the vehicle 720 has stopped beside a stop sign 724 at a four-way intersection on the roadway 710. The controller apparatus 722 detects three vehicles: a vehicle 730, a vehicle 732, and a vehicle 734. The vehicle 730 and the vehicle 734 have stopped at a stop sign 740 and a stop sign 742, respectively. The vehicle 732 is moving past a stop sign 744 and across the four-way intersection along a path 746.

The controller apparatus 722 determines that the vehicle 734 is an autonomous vehicle and sends an external communication to the vehicle 734 in the form of a radio transmission that indicates that the vehicle 720 will wait for the vehicle 730 to move. In this example, the vehicle 730 is a bicycle ridden by a rider. After waiting for the vehicle 730 to move, the vehicle 720 will move in a predetermined sequence after determining that the vehicle 734 has moved. In some implementations, the controller apparatus 722 may have a predetermined priority order when encountering a four-way stop intersection, such as proceeding based on the arrival time at a respective stop sign or yielding to non-autonomous vehicles such as the vehicle 730 and negotiating priority with other autonomous vehicles.

Figure 8:
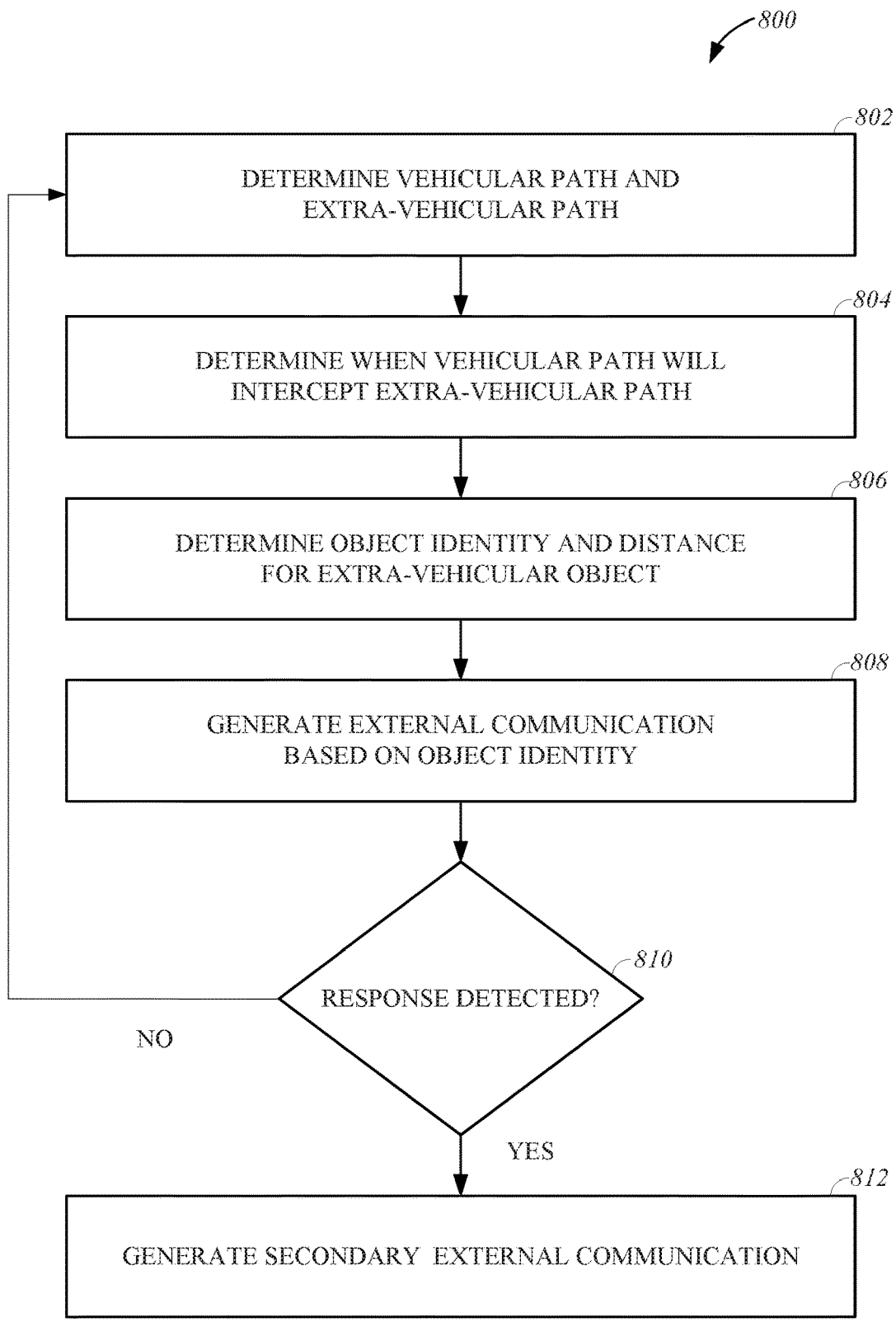
FIG. 8 is a flow chart of a method for external communication when an extra-vehicular object is on an extra-vehicular path that may intercept a vehicle's path.

FIG. 8 is a flow chart of a method 800 for external vehicle communication. In some implementations, the method 800 for external vehicle communication may be implemented by the vehicle 120 or the controller apparatus 122 shown in FIG. 1. In another implementation, some or all aspects of the method 800 for external vehicle communication may be implemented in a system combining the features described in previous embodiments.

At operation 802, the controller apparatus 122 determines a vehicular path for the vehicle 120 and an extra-vehicular path for an extra-vehicular object external to the vehicle. As an example, the extra-vehicular object may be any object external to the vehicle 120 including animate objects, such as the vehicle 130 and the vehicle 132, and inanimate objects, such as the building 134, illustrated in FIG. 1. In an implementation, the vehicle path is based on vehicle data and the extra-vehicular path is based on extra-vehicular data. The vehicular data and the extra-vehicular data include data corresponding to: vehicle velocity; extra-vehicular object velocity; vehicle orientation; extra-vehicular object orientation; vehicle position; extra-vehicular object position; an extra-vehicular object appearance profile; an extra-vehicular object sound profile; an extra-vehicular object electromagnetic profile; or the state of the ground or other surface in a predetermined area in proximity to the vehicle or the extra-vehicular object.

The controller apparatus 122 may determine the vehicle path and the extra-vehicular path by generating a mapping of the position of the vehicle 120 and the extra-vehicular object over time based on the vehicular data and the extra-vehicular data. As an example, the trajectory of the vehicle 120 and the extra-vehicular object may be determined based on respective velocities and directions of travel for the vehicle 120 and the extra-vehicular object. Based on the determined trajectories, the controller apparatus 122 may determine the vehicle path for the vehicle 120 and the extra-vehicular path for the extra-vehicular object over a predetermined period of time.

In an implementation, the sensor 124 may detect one or more sensory outputs such as: optical outputs including still images or video; auditory outputs including the sounds emitted by the extra-vehicular objects; or electromagnetic outputs such as radio waves emitted by the extra-vehicular objects. As an example, the velocities, orientations, or positions of the vehicle 120 or the extra-vehicular objects may be determined by the controller apparatus 122 on the basis of the sensor data received from the sensor 124. Further, the sensor 124 may generate sensor data based on the optical outputs which may include a color, a shape, or three-dimensional spatial information that may be used to generate a three-dimensional representation of one or more extra-vehicular objects.

As an example, the controller apparatus 122 may filter, enhance, transform, or convert still images or video frames in the sensor data. Further, the controller apparatus 122 may recognize text in a still image or video frame and convert the recognized text into a machine coded format such as the American standard code for information interchange (ASCII). The controller apparatus 122 may also compare the electromagnetic outputs to corresponding electromagnetic signatures, and thereby identify the extra-vehicular objects based on matches between the electromagnetic outputs and the electromagnetic signatures. The controller apparatus 122 may also determine an ambient sound level based on the auditory output. The ambient sound level may be used to calibrate the magnitude or amplitude of external communications that are generated by the controller apparatus 122.

The controller apparatus may also determine the velocity, orientation, or position of the vehicle 120 based on vehicle state data that is received from a vehicle system of the vehicle 120. As an example, the controller apparatus 122 may receive vehicle state data from a suspension system or a braking system (not shown), including an indication that the wheels are spinning at a certain number of rotations per minute (RPM), thereby providing information from which the controller apparatus 122 may determine vehicle velocity.

In some embodiments, velocity, orientation, or position of the vehicle 120 or an extra-vehicular object may be determined on the basis of positioning data received from an external source such as a remote server or a global positioning system (GPS) which may track the velocity, orientation, or position of the vehicle 120 and provide the vehicle velocity, orientation, or position data to the controller apparatus 122 which may receive the data signal through a transceiver (not shown).

The controller apparatus 122 may determine a geographic location of the vehicle 120 based on a correspondence between the position of the vehicle 120 and geographic location data associated with the position. As an example, the geographic location may include a position of the vehicle 120, such as geographic coordinates, and the corresponding geographic location data may include additional data corresponding to the location such as: whether the location is urban, suburban, or rural; noise regulations associated with the geographic location; or traffic data or construction data associated with the geographic location.

In an implementation, the controller apparatus 122 may determine the state of the ground or surface in a predetermined area around the vehicle 120, based on one or more inputs from the sensor 124. In an example, the state of the ground or surface includes: an amount of snow, water, or other matter on the ground or surface; the type of surface, such as grass, gravel, mud, water, or pavement; ground identifiers such as traffic lines or other indications that regulate the way the vehicle 120 may navigate the surface; or surface contour data indicating the protrusions, gaps, or depressions on the surface that may restrict or limit vehicle access. In this way, the state of the ground or surface may be used to determine more accurate vehicle data or extra-vehicular data that takes into account potential slippage or other changes in traction by the vehicle or extra-vehicular object.

At operation 804, the controller apparatus 122 determines whether, or when, the vehicular path will intercept or intersect the extra-vehicular path based on the vehicle state data and the extra-vehicular state data.

The vehicle path and the extra-vehicular paths determined by controller apparatus 122 may include respective sets of vehicle coordinates and extra-vehicular coordinates over a period of time. When the vehicle coordinates and extra-vehicular coordinates are within a predetermined distance, a potential interception of the extra-vehicular object by the vehicle 120 is determined to be imminent. In an implementation, the determination of when the vehicular path will intercept or intersect the extra-vehicular path includes a margin of error that is added to the predetermined distance between the vehicle 120 and the extra-vehicular object or to the trajectory of the vehicle 120 with respect to the extra-vehicular object.

In an implementation, the controller apparatus 122 determines, based on the vehicle state data and the extra-vehicular state data, a period of time that will elapse before the vehicular path will intercept or intersect the extra-vehicular path. The controller apparatus 122 may generate the external communication when the period of time that will elapse before the vehicular path will intercept or intersect the extra-vehicular path is less than an intercept threshold time.

At operation 806, the controller apparatus 122 determines an object identity for the extra-vehicular object and a distance between the vehicle 120 and the extra-vehicular object. In an example, determination of the object identity may be based on the extra-vehicular state data including the sensor data received from the sensor 124, and determination of the distance between the vehicle and the extra-vehicular object may be based on the extra-vehicular data including the sensor data from the sensor 124 or the GPS data from a remote data source such as the remote computing system 142 illustrated in FIG. 1.

In an implementation, determination of the identity of the extra-vehicular object includes a comparison or matching between the extra-vehicular state data and object identity data comprising a plurality of object identity profiles. In an implementation, the object identity profiles include data associated with a particular type of extra-vehicular object including: optical outputs such as images or video; auditory outputs such as sound recordings; or electromagnetic signatures that are associated with a particular type of extra-vehicular object.

As an example, when the extra-vehicular data corresponds to at least one of the plurality of object identity profiles, the extra-vehicular data is determined to match the object identity profile. When there is no direct match between the sensor data and one of the plurality of object identity profiles, a best-fit match may be made to the object identity profile of the plurality of object identity profiles that most closely corresponds to the sensor data. In an example, an extra-vehicular object that is 20 meters long, 2.5 meters wide, and 3.5 meters tall, has 18 wheels, and travels at a velocity of 100 kilometers per hour could be identified as a cargo truck based on the similarity of the characteristics in the sensor data to a cargo truck profile, even if no two of the plurality of object identity profiles have exactly the same set of characteristics.

The sensor data may be used to discriminate between extra-vehicular objects that are inanimate objects, such as buildings, bridges, and other structures that do not move or move very infrequently, and extra-vehicular objects that are temporarily stationary, such as vehicles or pedestrians that are waiting to move. In this way, the controller apparatus 122 will generate an extra-vehicular path for a temporarily stationary object that may move within a predetermined time period.

In an implementation, the controller apparatus 122 determines a forward-facing side of the extra-vehicular object based on the object identity. The forward-facing side of the extra-vehicular object may be based on the object identity that is determined for the extra-vehicular object including facing-side data, such as images of the forward-facing side of an extra-vehicular object, to indicate the forward-facing side of the extra-vehicular object. Based on the determination of which side of the extra-vehicular object is the forward-facing side, the controller apparatus 122 may adjust the type, magnitude, or frequency of an external communication that is generated.

In an implementation, the controller apparatus 122 may determine the forward-facing side of the extra-vehicular object based on the orientation and velocity of the extra-vehicular object, such that the side of the extra-vehicular object that is facing the direction of travel for the extra-vehicular object is determined to be the forward-facing side of the extra-vehicular object.

At operation 808, the controller apparatus 122 generates at least one external communication based on the object identity when the distance between the vehicle 120 and the extra-vehicular object is less than a predetermined threshold distance. Further, the external communication may include an external communication that is directed to the interior of the vehicle 120, such as through output components (e.g. speakers, displays, etc.) located within the passenger cabin or passenger compartment of the vehicle 120. The external communication directed to the interior of the vehicle 120 may include: visual communications such as written notifications or video images displayed on a screen inside the passenger cabin; audible communications such as auditory notifications produced by speakers inside the passenger cabin (e.g. providing a notification that the vehicle 120 is entering a school zone) or trunk of the vehicle 120 (e.g. providing a notification of an approaching motor vehicle to a driver as the contents of the trunk are being unloaded); or haptic communications such as vibrations produced in the steering wheel. As such, an external communication directed at the interior of the vehicle 120 may be used to apprise the driver or passengers in the vehicle 120 of events that are occurring, or may occur, outside of the vehicle 120.

In an implementation, the external communication is generated by the controller apparatus 122 on the basis of a correspondence between the object identity, the external communication data, and the vehicle state data or the extra-vehicular state data. The correspondence between the object identity and the external communication data may be performed based on a matching or look-up of values between the object identity data and the external communication data.

As an example, the external communication may be generated based on a time threshold, such as when a time before the vehicle 120 will intercept the extra-vehicular object is less than an intercept time threshold. As an example, after determining a correspondence between the object identity and the external communication data, the controller apparatus 122 may then determine a specific external communication based on the relationship between the vehicle 120 and the extra-vehicular object. As a further example, the relationship between the vehicle 120 and the extra-vehicular object includes a spatial or temporal relationship as determined from the vehicle data or the extra-vehicular data.

In an implementation, the external communication is in the form of a communication type that includes: an audible external communication such as a verbal instruction, chime, or horn; a visual external communication such as a still image, moving image, text image, pattern of lights, colored light, ground projection, or hologram; or a tactile external communication such as a vibration on the exterior of the vehicle 120 that may be felt when the vehicle 120 is touched.

In an implementation, the controller apparatus 122 determines the communication type based on communication factors corresponding to the object identity, the vehicle state data, or the extra-vehicular state data. The communication factors include properties or attributes of the vehicle 120 or the extra-vehicular environment including the velocity of the vehicle 120, the object velocity, the distance between the vehicle 120 and the extra-vehicular object, the object orientation relative to the vehicle 120, or the time of day.

In this way, the type of external communication is relevant to the identity of the extra-vehicular object including the circumstances and the environment surrounding the extra-vehicular object. As an example, when the object identity indicates a pedestrian, an audible external communication such as a message may be generated. When the external communication is directed at the passenger of a vehicle, a visual external communication such as a blinking light may be generated.

The controller apparatus 122 may determine a communication magnitude for the external communication based on the communication factors. The controller apparatus 122 may adjust the communication magnitude by modifying a frequency or an intensity of the external communication. In an implementation, the adjustment of the communication magnitude by the controller apparatus 122 may include: changing the volume or pitch of an auditory communication; changing the content of an auditory communication to include more urgent language; changing the intensity or color of a light; changing the frequency at which a light blinks or pulsates; or changing the severity or urgency of a graphical display or textual message. In an implementation, the communication magnitude may be based on the time of day or the date so that the volume of an audible communication may be reduced during evening hours or on a Sunday.

The communication type or the communication magnitude may be based on the ambient sound level within a predetermined area of the vehicle 120. For example, a lower ambient sound level, such as on an empty rural road at night, may result in a lower volume for an audible communication than when a higher ambient sound level is detected, such as on a busy city street at midday. In some embodiments, when the ambient sound level is determined to be at a high level, an audible communication may be determined to be less effective and another type of communication such as a visual communication may be generated. For example, on a busy city street with many vehicles using horns, generating a visual communication such as a flashing light may be determined to be more effective.

In an implementation, the communication type or the communication magnitude may be based on whether the forward-facing side of the extra-vehicular object is oriented towards the vehicle 120. For example, if the extra-vehicular object is determined to be a pedestrian and the pedestrian is facing away from the vehicle 120, then a visual communication will not be seen by the pedestrian. As such, an audible communication type, such as a horn or an audible message, may be used to attract the attention of the pedestrian.

The controller apparatus 122 may determine a context based on sensory cues including visual cues or auditory cues from the extra-vehicular object or an area within a predetermined distance of the vehicle 120. The visual cues or auditory cues may be based on context data from the sensors 124 which are able to detect the context. Further, the communication type or the communication magnitude may be based on the context data.

The context data may include: visual cue context data corresponding to visual output such as moving images and still images; or audio cue context data corresponding to audio output such as sound. In an implementation, the visual cue context data may be based on visual output data received from the sensors 124 and may be compared against visual cue profile data to determine the context surrounding the vehicle 120. Further, the visual cue context data may be used to determine a degree or level of visibility of the vehicle 120, or display portions of the vehicle 120, to extra-vehicular objects such as pedestrians or motor vehicles. As such, based on visual cue context data that indicates that some or all of a display portion of the vehicle 120 is obscured, the controller apparatus 122 may determine that an audible external communication may be used in addition to, or instead of, a visual external communication.

As an example, the visual cue context data may be based on a visual output that corresponds to weather conditions including: precipitation conditions such as the presence of snow, rain, smog, or fog; cloud conditions including the amount of cloud coverage (e.g. overcast conditions); humidity conditions such as the presence of accumulated moisture which may obscure display portions of the vehicle 120; wind conditions which may obscure the visibility of extra-vehicular objects by blowing matter such as leaves or grass onto display portions of the vehicle 120; or sunlight conditions based on the position of the sun and the intensity of sunlight that may obscure display portions in the vehicle 120 (e.g. glare). The audio cue context data may be based on audio output data received from the sensors 124 and compared against audio cue profile data to determine the context surrounding the vehicle 120.

The controller apparatus 122 may retrieve zoning data corresponding to the geographic location of the vehicle 120, and the external communication may be further based on the zoning data. The zoning data may include an indication of the way that a geographic area is zoned, such as a school zone, a residential zone, or an industrial zone. The controller apparatus 122 may determine the communication type or the communication magnitude based on the zoning data. In an implementation, an audible communication or a visual communication generated in a school zone may use simpler language better suited for children.

At decision tree 810, in response to the controller apparatus 122 detecting an extra-vehicular response by the extra-vehicular object to the external communication, the Yes branch is taken to operation 812. If no extra-vehicular response to the external communication is detected by the controller apparatus 122, the No branch is taken to return the method 800 to operation 802.

In an implementation, the extra-vehicular response may include a change in the extra-vehicular object's orientation or the extra-vehicular object's velocity that modifies the extra-vehicular path to avoid intercepting the vehicular path. In another implementation, the extra-vehicular response may include feedback from the extra-vehicular object including audible feedback such as a vocalization or visual feedback such as a gesture or movement by the extra-vehicular object.

At operation 812, the controller apparatus 122 generates a secondary external communication in response to the extra-vehicular response. As an example, after providing an external communication that the vehicle 120 intends to move forward and responsive to detecting that an extra-vehicular object such as a pedestrian has stopped at an intersection and is providing feedback in the form of a hand gesture to indicate that the vehicle 120 should move forward, the controller apparatus 122 may generate a visual communication that displays "thank you" on a display portion of the vehicle 120 that is visible to the pedestrian. In this way, the extra-vehicular object receives an acknowledgment of the extra-vehicular object's response to the external communication that was initially generated by the controller apparatus 122.

Figure 9:
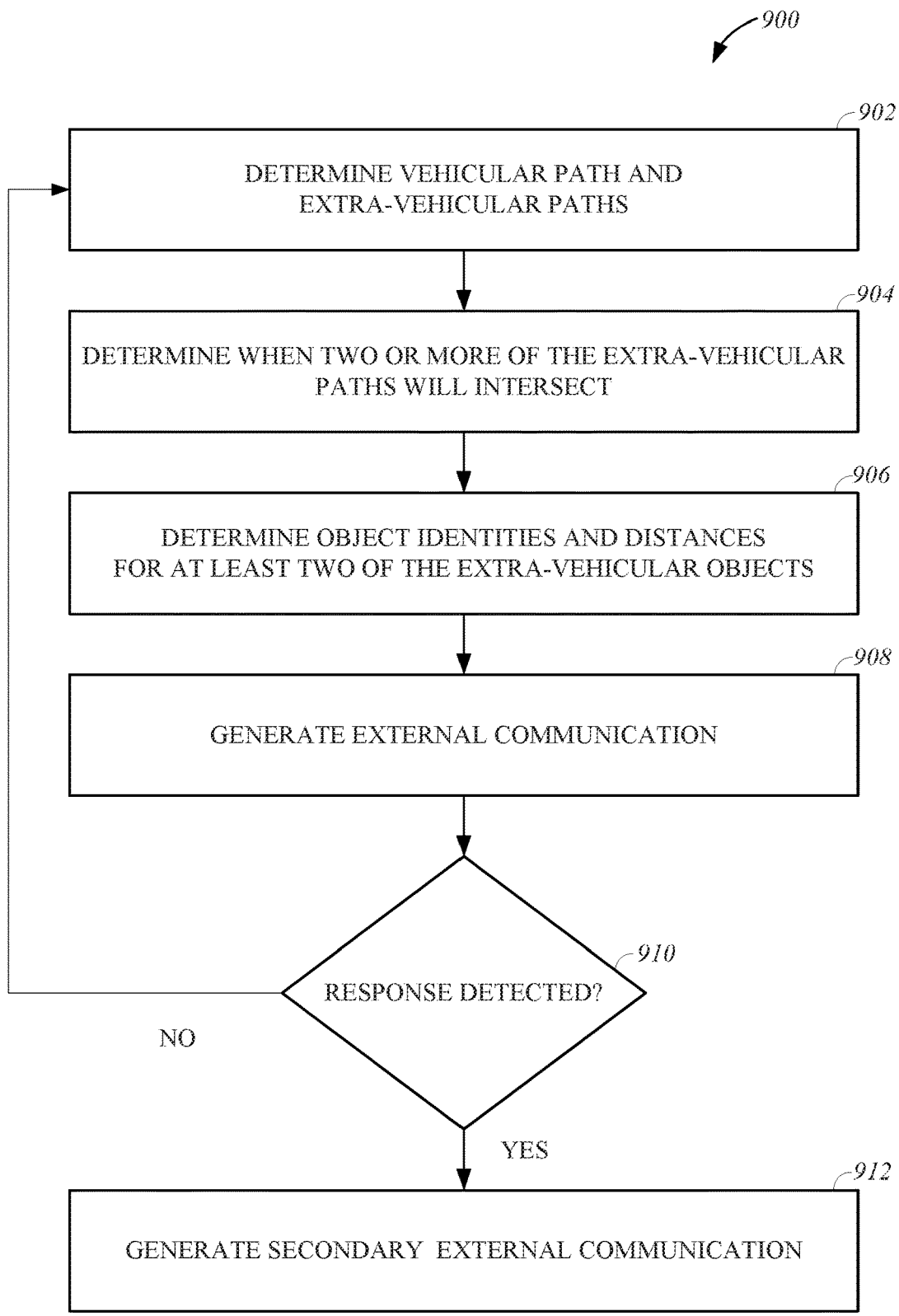
FIG. 9 is a flow chart of a method for generating an external communication when at least two extra-vehicular paths intersect.

FIG. 9 is a flow chart of a method 900 for external vehicle communication. In some implementations, the method 900 for external vehicle communication may be implemented by the vehicle 120 or the controller apparatus 122 shown in FIG. 1. In another implementation, some or all aspects of the method 900 for external vehicle communication may be implemented in a system combining the features described in previous embodiments.

At operation 902, the controller apparatus 122 determines extra-vehicular paths for at least two extra-vehicular objects external to the vehicle 120. As an example, the extra-vehicular objects may include any object external to the vehicle 120, including animate objects such as the vehicle 130, or the vehicle 132, and inanimate objects such as the building 134, illustrated in FIG. 1. In an implementation, the extra-vehicular paths are based on extra-vehicular data. The extra-vehicular data includes data corresponding to: extra-vehicular object velocities; extra-vehicular object orientations; extra-vehicular object positions; extra-vehicular object appearance profiles; extra-vehicular object sound profiles; extra-vehicular object electromagnetic profiles; or the state of the ground or other surface in a predetermined area in proximity to the vehicle 120 or the extra-vehicular objects.

The controller apparatus 122 may determine the extra-vehicular paths by generating a mapping of the position of the extra-vehicular objects over time based on the extra-vehicular data. In an example, the trajectory of the extra-vehicular objects may be determined based on respective velocities and directions of travel. Based on the determined trajectories, the controller apparatus 122 may determine the extra-vehicular paths for the extra-vehicular objects over a predetermined period of time.

In an implementation, the sensor 124 may detect one or more sensory outputs such as: optical outputs including still images or video; auditory outputs including the sounds emitted by the extra-vehicular objects; or electromagnetic outputs such as radio waves emitted by the extra-vehicular objects. As an example, the velocities, orientations, or positions of the extra-vehicular objects may be determined by the controller apparatus 122 on the basis of the sensor data received from the sensor 124. Further, the sensor 124 may generate sensor data based on the optical outputs which may include a color, a shape, or three-dimensional spatial information that may be used to generate a three-dimensional representation of one or more of the extra-vehicular objects.

The controller apparatus 122 may filter, enhance, transform, or convert still images or video frames in the sensor data. Further, the controller apparatus 122 may recognize text in a still image or video frame and convert the recognized text to a machine coded format such as ASCII. The controller apparatus 122 may also compare the electromagnetic outputs to corresponding electromagnetic signatures and thereby identify the extra-vehicular objects based on matches between the electromagnetic outputs and the electromagnetic signatures. In some embodiments, the controller apparatus 122 may determine an ambient sound level based on the auditory outputs. The ambient sound level may be used to calibrate the magnitude or amplitude of external communications that are generated by the controller apparatus 122.

The controller apparatus 122 may also determine the velocities, orientations, or positions of the extra-vehicular objects based on positioning data received from an external source such as a remote server or a GPS which may track the velocities, orientations, or positions of the extra-vehicular objects and provide the velocity data, orientation data, or position data to the controller apparatus 122 which may receive the data through a transceiver such as the communication component in controller apparatus 122 shown in FIG. 1.

The controller apparatus 122 may determine geographic locations for the extra-vehicular objects based on a correspondence between the positions of the extra-vehicular objects and geographic location data associated with the positions. As an example, the geographic locations may include a position of the at least two extra-vehicular objects, such as geographic coordinates, and the corresponding geographic location data may include additional data corresponding to the location such as: whether the locations are urban, suburban, or rural; noise regulations associated with the geographic locations; or traffic data or construction data associated with the geographic locations.

In an implementation, the controller apparatus 122 may determine the state of the ground or surface in a predetermined area around the at least two extra-vehicular objects based on one or more inputs from the sensor 124. In an example, the state of the ground or surface includes: an amount of snow, water, or other matter on the ground or surface; the type of surface, such as grass, gravel, mud, water, or pavement; ground identifiers such as traffic lines or other indications that regulate the way the at least two extra-vehicular objects may navigate the surface; or surface contour data indicating the protrusions, gaps, or depressions on the surface that may restrict or limit access by the at least two extra-vehicular objects. In this way, the state of the ground or surface may be used to determine more accurate extra-vehicular data that takes into account potential slippage or other changes in traction by the extra-vehicular objects.

At operation 904, the controller apparatus 122 determines whether, or when, two or more of the extra-vehicular paths will intersect or intercept based on the extra-vehicular state data.

In an implementation, the extra-vehicular paths determined by controller apparatus 122 may include respective sets of extra-vehicular coordinates over a predetermined period of time. When the extra-vehicular coordinates are within a predetermined distance, a potential intersection of the extra-vehicular objects is determined to be imminent. In an implementation, the determination of when two or more of the extra-vehicular paths will intersect or intercept includes a margin of error that is added to the predetermined distance between the extra-vehicular objects or to the trajectory of the extra-vehicular objects.

In an implementation, the controller apparatus 122 determines, based on the extra-vehicular state data, a period of time that will elapse before the extra-vehicular paths will intersect or intercept. The controller apparatus 122 may generate the external communication when the period of time that will elapse before the at least two extra-vehicular paths intersect is less than an intersect threshold time.

At operation 906, the controller apparatus 122 determines object identities for the extra-vehicular objects and a distance between the extra-vehicular objects. In an example, determination of the object identities may be based on the extra-vehicular state data including the sensor data received from the sensor 124, and determination of the distance between at least two of the extra-vehicular objects may be based on the extra-vehicular data including the sensor data from the sensor 124 or the GPS data from a remote data source such as the remote computing system 142 illustrated in FIG. 1.

In an implementation, the determination of the identities of at least two of the extra-vehicular objects includes a comparison or matching between the extra-vehicular state data and the object identity data comprising a plurality of object identity profiles. In an implementation, the object identity profiles include data associated with a particular type of extra-vehicular object including: optical outputs such as images or video; auditory outputs such as sound recordings; or electromagnetic signatures that are associated with a particular type of extra-vehicular object.

As an example, when the extra-vehicular data corresponds to at least one of the plurality of object identity profiles, the extra-vehicular data is determined to match the object identity profile. When there is no direct match between the sensor data and one of the plurality of object identity profiles, a best-fit match may be made to the object identity profile that most closely corresponds to the sensor data. In an example, an extra-vehicular object that is 6 meters long, 2 meters wide, and 1.5 meters tall, has multiple transparent surfaces (windows), and travels at a velocity of 60 kilometers per hour could be identified as an automobile based on the similarity of the characteristics in the sensor data to an automobile profile, even if no two of the plurality of object identity profiles have exactly the same set of characteristics.

In an implementation, the sensor data may be used to discriminate between extra-vehicular objects that are inanimate, such as buildings, bridges, and other structures that do not move or move very infrequently, and extra-vehicular objects that are temporarily stationary, such as vehicles or pedestrians that are waiting to move. In this way, the controller apparatus 122 will generate an extra-vehicular path for a temporarily stationary object that may move within a predetermined time period.

In an implementation, the controller apparatus 122 may determine forward-facing sides of the extra-vehicular objects based on the object identities corresponding to the extra-vehicular objects. Determination of the forward-facing sides of the extra-vehicular objects may be based on the object identities that are determined for the extra-vehicular objects including facing-side data, such as images of the forward-facing sides of the extra-vehicular objects, to indicate the forward-facing sides of the extra-vehicular objects. Based on the determination of which sides of the extra-vehicular objects are the forward-facing sides, the controller apparatus 122 may adjust the type, magnitude, or frequency of an external communication that is generated.

The controller apparatus 122 may determine forward-facing sides for the extra-vehicular objects based on the orientations and velocities of the extra-vehicular objects, such that the sides of the extra-vehicular objects that are facing the direction of travel of each of the other extra-vehicular objects are determined to be the forward-facing sides of the respective extra-vehicular objects.

At operation 908, the controller apparatus 122 generates at least one external communication based on the object identities when the distance between at least two of the extra-vehicular objects is less than a predetermined threshold distance. Further, the external communication may include an external communication that is directed to the interior of the vehicle 120, such as through output components (e.g. speakers, displays, etc.) located within the passenger cabin or passenger compartment of the vehicle 120. The external communication directed to the interior of the vehicle 120 may include: visual communications such as written notifications or video images displayed on a screen inside the passenger cabin; audible communications such as auditory notifications produced by speakers inside the passenger cabin (e.g. providing a notification that the vehicle 120 is entering a school zone) or trunk of the vehicle 120 (e.g. providing a notification of an approaching motor vehicle to a driver as the contents of the trunk are being unloaded); or haptic communications such as vibrations produced in the steering wheel. As such, an external communication directed at the interior of the vehicle 120 may be used to apprise the driver or passengers in the vehicle 120 of events that are occurring, or may occur, outside of the vehicle 120.

In an implementation, the external communication is generated by the controller apparatus 122 based on a correspondence between the object identities, external communication data, and the extra-vehicular state data. The correspondence between the object identities and the external communication data may be performed based on a matching or look-up of values between the object identity data and the external communication data.

As an example, the external communication data may be generated based on a time threshold, such as when a time before at least two of the extra-vehicular objects intersect or intercept is less than an intersect time threshold. As a further example, after determining a correspondence between the object identities and the external communication data, the controller apparatus 122 may then determine a specific external communication based on the relationship between the extra-vehicular objects. As an example, the relationship between the extra-vehicular objects includes a spatial or temporal relationship as determined from the extra-vehicular data.

The external communication may be in the form of a communication type that includes: an audible external communication such as a verbal instruction, chime, or horn; a visual external communication such as a still image, moving image, text image, pattern of lights, colored light, ground projection, or hologram; or a tactile external communication such as a vibration on the exterior of the vehicle 120 that may be felt when the vehicle 120 is touched.

In an implementation, the controller apparatus 122 determines the communication type based on communication factors corresponding to the object identity, vehicle state data, or the extra-vehicular state data, such as the velocity of the vehicle 120, object velocities, the distance between the vehicle 120 and the extra-vehicular objects, the distance between the extra-vehicular objects, the extra-vehicular object orientations relative to the vehicle 120, or the time of day.

In this way, the type of external communication is relevant to the identities of the extra-vehicular objects and the circumstances and environment surrounding the extra-vehicular objects. As an example, when the object identity of one of the extra-vehicular objects indicates a pedestrian, an audible external communication such as a message may be generated. When the external communication is directed at a passenger of a vehicle, a visual external communication such as a pulsating light may be generated.

The controller apparatus 122 may determine a communication magnitude for the external communication based on the communication factors. The controller apparatus 122 may adjust a communication magnitude by modifying a frequency or an intensity of the external communication. In an implementation, the adjustment to the communication magnitude by the controller apparatus 122 may include: changing the volume or pitch of an auditory communication; changing the content of an auditory communication to include more urgent language; changing the intensity or color of a light; changing the frequency at which a light blinks or pulsates; or changing the severity or urgency of a graphical display or textual message. In an implementation, the communication magnitude may be based on the time of day or the date so that the volume of an audible communication may be reduced during evening hours or on a Sunday.

In an implementation, the communication type or the communication magnitude may be based on the ambient sound level. For example, a lower ambient sound level, such as on an empty rural road at night, may result in a lower volume for an audible communication than when a higher ambient sound level is detected, such as on a busy city street at midday. In an embodiment, when the ambient sound level is determined to be at a high level, an audible communication may be determined to be less effective, and another type of communication such as a visual communication may be generated. As an example, on a busy city street with many vehicles using horns, generating a visual communication such as a flashing light may be determined to be more effective.

The communication type or the communication magnitude may be based on whether the forward-facing sides of the extra-vehicular objects are oriented towards the vehicle 120. For example, if some of the extra-vehicular objects are determined to be pedestrians and the pedestrians are facing away from the vehicle 120, then a visual communication will not be seen by the pedestrians. As such, an audible communication type, such as a horn, may be used to attract the attention of the pedestrians.

In an implementation, the controller apparatus 122 determines a context based on sensory cues including visual cues or auditory cues from the extra-vehicular objects or an area within a predetermined distance of the vehicle 120. The visual cues or auditory cues may be based on context data from the sensor 124 which is able to detect the context. Further, the communication type or the communication magnitude may be based on the context data.

The context data may include: visual cue context data corresponding to visual output such as moving images and still images; or audio cue context data corresponding to audio output such as sound. In an implementation, the visual cue context data may be based on visual output data received from the sensor 124 and may be compared against visual cue profile data to determine the context surrounding the vehicle 120. Further, the visual cue context data may be used to determine a degree or level of visibility of the vehicle 120, or display portions of the vehicle 120, to extra-vehicular objects such as pedestrians or motor vehicles. As such, based on visual cue context data that indicates that some or all of a display portion of the vehicle 120 is obscured, the controller apparatus 122 may determine that an audible external communication may be used in addition to, or instead of a visual external communication.

As an example, the visual cue context data may be based on a visual output that corresponds to weather conditions including: precipitation conditions such as the presence of snow, rain, smog, or fog; cloud conditions including the amount of cloud coverage (e.g. overcast conditions); humidity conditions such as the presence of accumulated moisture which may obscure display portions of the vehicle 120; wind conditions which may obscure the visibility of extra-vehicular objects by blowing matter such as leaves or grass onto display portions of the vehicle 120; or sunlight conditions based on the position of the sun and the intensity of sunlight that may obscure display portions in the vehicle 120 (e.g. glare). In an implementation, the audio cue context data may be based on audio output data received from the sensor 124 and compared against audio cue profile data to determine the context surrounding the vehicle 120. In this way, the external communication that is generated may be more applicable to the environment surrounding the vehicle 120.

In an implementation, the controller apparatus 122 retrieves zoning data corresponding to the geographic location of the vehicle 120 and the external communication may also be based on the zoning data. The zoning data may include an indication of the way that a geographic area is zoned, such as a school zone, a residential zone, or an industrial zone. In this way, the communication type or the communication magnitude may be based on the zoning data. In an implementation, an audible communication or a visual communication generated in a school zone may use simpler language better suited for children.

At decision tree 910, in response to the controller apparatus 122 detecting at least one extra-vehicular response to the external communication by at least one of the extra-vehicular objects, the Yes branch is taken to operation 912. If no extra-vehicular response to the external communication is detected by the controller apparatus 122, the No branch is taken back to operation 902.

In an implementation, an extra-vehicular response includes a change in the orientation or velocity of at least one of the extra-vehicular objects that modifies at least one of the extra-vehicular paths to avoid intersecting or intercepting the other of the extra-vehicular paths. In another implementation, the extra-vehicular response may include feedback from at least one of the extra-vehicular objects including audible feedback, such as a vocalization, or visual feedback, such as a gesture or movement by at least one of the extra-vehicular objects.

At operation 912, the controller apparatus 122 generates a secondary external communication in response to the extra-vehicular response. As an example, the vehicle 120 may provide an external communication indicating that the paths of two extra-vehicular objects, a bus and a cyclist, may intersect. After providing this external communication, and responsive to detecting that the cyclist has changed his orientation so that the path of the cyclist will no longer intersect the path of the bus, the controller apparatus 122 may generate a visual communication that displays "thank you" on a display portion of the vehicle 120 that is visible to the cyclist. In this way, the cyclist receives an acknowledgment of the cyclist's response to the external communication that was initially generated by the controller apparatus 122.

Figure 10:
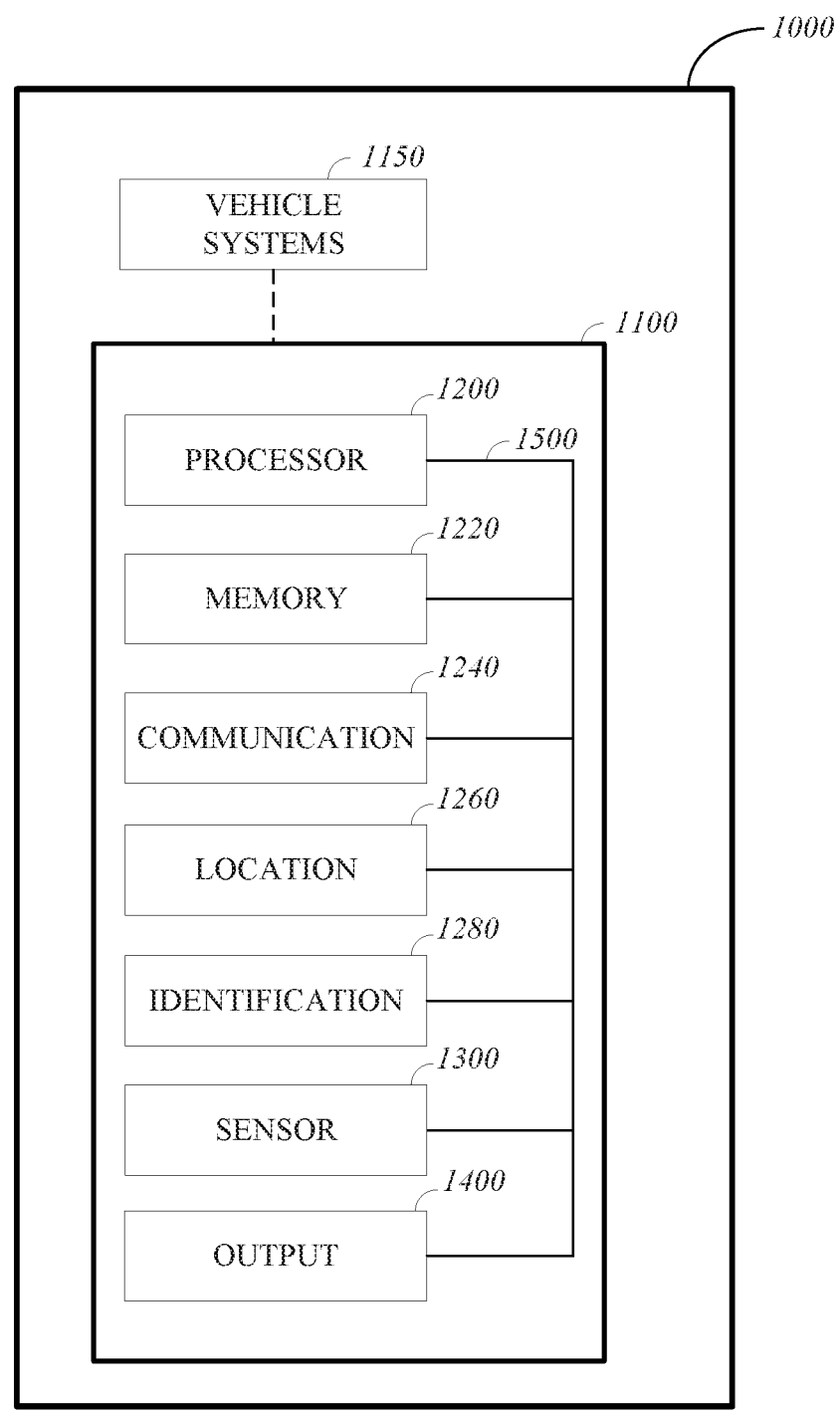
FIG. 10 is a diagram illustrating an example of a controller apparatus.

FIG. 10 illustrates a vehicle 1000 in which the disclosed aspects, features, and elements may be implemented. FIG. 10 illustrates that the vehicle 1000 includes a controller apparatus 1100 which may be used to control a variety of vehicle systems 1150 or combinations of vehicle systems 1150 of the vehicle 1000. In an implementation, the vehicle 1000 may include some or all of the features of the vehicle 120 illustrated in FIG. 1, and the controller apparatus 1100 may include some or all of the features of the controller apparatus 122 illustrated in FIG. 1. The vehicle systems 1150 may include battery systems, powertrain systems, transmission systems, braking systems, steering systems, suspension systems (not shown), or any other systems used to cause or control movement of the vehicle 1000.

The controller apparatus 1100 may include any combination of a processor 1200, a memory 1220, a communication component 1240, a location component 1260, an identification component 1280, a sensor component 1300, an output component 1400, or a communication bus 1500.

In an implementation, the processor 1200 may execute one or more instructions such as the program instructions stored in the memory 1220. As an example, the processor 1200 may include one or more: central processing units (CPUs); general purpose processors with one or more processing cores; special purpose processors with one or more cores; digital signal processors (DSPs); microprocessors; controllers; microcontrollers; integrated circuits; Application Specific Integrated Circuits (ASIC); Field Programmable Gate Arrays (FPGA); or programmable logic controllers.

The memory 1220 may include a tangible non-transitory computer-readable medium that may be used to store program instructions such as computer-readable instructions, machine-readable instructions, or any type of data that may be used by the processor 1200. As an example, the memory 1220 may include any computer readable media that may be accessed by the processor 1200, such as read only memory (ROM) or random access memory (RAM). Further, the memory 1220 may include volatile memory or non-volatile memory such as: solid state drives (SSDs), hard disk drives (HDDs), dynamic random access memory (DRAM); or erasable programmable read-only memory (EPROM).

The communication component 1240 may be used to transmit or receive signals, such as electronic signals, via a wired or wireless medium. As an example, the communication component 1240 may transmit or receive signals such as radio frequency (RF) signals which may be used to transmit or receive data that may be used by the processor 1200 or stored in the memory 1220.

The location component 1260 may generate navigation data or geolocation data that may be used to determine a velocity, an orientation, a latitude, a longitude, or an altitude for the vehicle 1000. The location component 1260 may include one or more navigation devices that are able to use navigational systems such as GPS, the long range navigation system (LORAN), the Wide Area Augmentation System (WAAS), or the global navigation satellite system (GLONASS).

The identification component 1280 may include specialized instructions for: operating the vehicle 1000; communicating with remote data sources; determining the state of the vehicle 1000; determining the state of extra-vehicular objects; or determining the identity of extra-vehicular objects. In some implementations, a portion of the memory 1220 may be coupled to the identification component 1280 via the communication bus 1500.

The sensor component 1300 may include one or more sensors that detect the state or condition of the physical environment inside the vehicle 1000 and the physical environment external to the vehicle 1000 including the state or condition of one or more extra-vehicular objects. In some implementations, the sensor component 1300 includes one or more of: an accelerometer, a gyroscope, a still image camera, a video camera, an infrared sensor, a LIDAR system, a radar system, a sonar system, a thermometer, a barometer, a moisture sensor, a vibration sensor, a capacitive input sensor, or a resistive input sensor. As an example, the sensor component 1300 may detect the state of stationary or moving objects including: physical structures such as buildings; vehicles such as automobiles and motorcycles; or non-vehicular entities such as pedestrians and vehicle drivers. Based on the sensory input detected by the sensor component 1300, the sensor component 1300 may generate sensor data that may be used to: operate the vehicle 1000; determine the state or condition of the vehicle 1000; or determine the state or condition of objects external to the vehicle 1000.

The output component 1400 may include one or more output devices that may be used to generate outputs including sensory outputs such as visual outputs, audible outputs, haptic outputs, or electrical outputs. In some implementations, the one or more output devices may include: visual output components to display still or video images such as a liquid crystal display (LCD), an organic light-emitting diode (OLED) display, or a cathode ray tube (CRT) display; audio output components such as loudspeakers; or haptic output components to produce vibrations or other types of tactile outputs.

The communication bus 1500 may include an internal bus or an external bus and may be used to couple any combination of the processor 1200, the memory 1220, the communication component 1240, the location component 1260, the identification component 1280, the sensor component 1300, or the output component 1400. As an example, the communication bus 1500 may include one or more buses such as: a peripheral component interconnect (PCI), Serial AT attachment (SATA), a HyperTransport (HT) bus, or a universal serial bus (USB).

The disclosed technology offers the advantages of improved external communication for both driver-controlled and autonomous vehicles including enhancement of vehicle and pedestrian awareness of the presence and intentions of the autonomous vehicle. Additionally, the disclosed technology provides external communications that apprise vehicles or pedestrians of the presence and path of other vehicles or pedestrians. By predicting the path of extra-vehicular objects such as vehicles or pedestrians, the disclosed technology may facilitate the efficiency of movement of both the vehicle and the extra-vehicular objects.

What is claimed is:

1. A method for external vehicle communication, the method comprising:
    determining, by a processor, a vehicular path for a vehicle and an extra-vehicular path for an extra-vehicular object external to the vehicle, the vehicular path based on vehicle state data including a vehicle velocity and a vehicle orientation, the extra-vehicular path based on extra-vehicular state data including an object velocity and an object orientation of the extra-vehicular object;
    in accordance with determining, by the processor, based on the vehicle state data and the extra vehicular state data, that the vehicular path intersects the extra-vehicular path, determining, by the processor, an object identity for the extra-vehicular object and a distance between the vehicle and the extra-vehicular object, wherein the object identity is based on the extra-vehicular state data;
    selecting, by the processor, a communication type based on a determination of whether a display portion of the vehicle is visible to the extra-vehicular object, the display portion being used for displaying external communications directed at the extravehicular object; and
    generating, by the processor, at least one external communication directed at the extra-vehicular object, the at least one external communication generated based on the object identity when the distance between the vehicle and the extra-vehicular object is less than a predetermined threshold distance, wherein the at least one external communication is further generated using the communication type.

2. The method of claim 1, wherein selecting the communication type comprises:
    determining, by the processor, the communication type based on communication factors including the vehicle velocity, the object velocity, the distance between the vehicle and the extra-vehicular object, the object orientation relative to the vehicle, or the object identity, the communication type including an audible communication or a visual communication, the audible communication including a verbal instruction, and the visual communication including a ground projection to indicate the vehicular path, wherein the external communication includes at least one communication type.

3. The method of claim 2, further comprising:
determining, by the processor, a communication magnitude based on the communication factors, wherein the communication magnitude modifies a frequency or an intensity of the external communication.

4. The method of claim 3, further comprising:
determining, by the processor, an ambient sound level, wherein the communication type or the communication magnitude is based on the ambient sound level.

5. The method of claim 3, further comprising:
determining, by the processor, a forward-facing side of the extra-vehicular object based on the object identity, wherein the communication type or the communication magnitude is based on whether the forward-facing side of the extra-vehicular object is oriented towards the vehicle.

6. The method of claim 1, further comprising:
determining, by the processor, based on the vehicle state data and the extra-vehicular state data, a period of time that will elapse before the vehicle intercepts the extra-vehicular object; and
generating, by the processor, the external communication when the period of time is less than an intercept threshold time.

7. The method of claim 1, further comprising:
detecting, by the processor, an extra-vehicular response by the extra-vehicular object to the external communication, the extra-vehicular response including a change in the object orientation or the object velocity that modifies the extra-vehicular path to avoid intercepting the vehicular path; and
generating, by the processor, a secondary external communication in response to the extra-vehicular response.

8. The method of claim 1, further comprising:
determining, by the processor, a context based on sensory cues including visual cues or auditory cues from the extra-vehicular object or an area within a predetermined distance of the vehicle, wherein the visual cues include cues corresponding to weather conditions within the predetermined distance of the vehicle and the external communication is further based on the context.

9. The method of claim 1, further comprising:
determining, by the processor, a geographic location of the vehicle; and
retrieving, by the processor, zoning data corresponding to the geographic location of the vehicle and a predetermined area associated with the geographic location of the vehicle, wherein the external communication is further based on the zoning data.

10. A method for external vehicle communication, the method comprising:
determining, by a processor, extra-vehicular paths for at least two extra-vehicular objects external to a vehicle, each extra-vehicular path based on extra-vehicular state data including an object identity, an object velocity, and an object orientation for a respective extra-vehicular object;
in accordance with determining, by the processor, based on the extra-vehicular state data, that two of the extra-vehicular paths intersect, determining, by the processor, object identities and a distance between the two extra-vehicular objects corresponding to the two extra-vehicular paths that will intersect, wherein the object identities are based on the extra-vehicular state data; and
generating, by the processor, at least one external communication directed at one or more of the at least two extra-vehicular objects, the at least one external communication generated based on the extra-vehicular state data when the distance between the two extra-vehicular objects is less than a predetermined threshold distance, wherein the at least one external communication is further generated using a communication type that is determined based on whether a display portion of the vehicle is visible to the extra-vehicular object, the display portion being used for displaying external communications directed at the extravehicular object.

11. The method of claim 10, further comprising:
determining, by the processor, the communication type based on communication factors including the distance between the two extra-vehicular objects, the object identity for each extra vehicular object, the object velocity for each extra-vehicular object, or the object orientation for each extra-vehicular object, the communication type including an audible communication or a visual communication, the audible communication including a verbal instruction, and the visual communication including a ground projection to indicate the extra-vehicular paths, wherein the external communication includes at least one communication type.

12. The method of claim 11, further comprising:
determining, by the processor, a communication magnitude based on the communication factors, wherein the communication magnitude modifies a frequency or an intensity of the external communication.

13. The method of claim 12, further comprising:
determining, by the processor, an ambient sound level, wherein the communication type or the communication magnitude is based on the ambient sound level.

14. The method of claim 12, further comprising:
determining, by the processor, forward-facing sides corresponding to the extra-vehicular objects based on the object identity for each of the respective extra-vehicular objects, wherein the communication type or the communication magnitude is based on whether the forward facing sides corresponding to the extra-vehicular objects are oriented towards the vehicle.

15. The method of claim 10, further comprising:
determining, by the processor, based on the extra-vehicular state data, a period of time that will elapse before the two extra-vehicular objects intersect; and
generating, by the processor, the external communication when the period of time is less than an intersect threshold time.

16. The method of claim 10, further comprising:
detecting, by the processor, an extra-vehicular response to the external communication by either one of the two extra-vehicular objects, the extra-vehicular response including a change in the object orientation or the object velocity of either one of the two extra-vehicular objects that modifies the extra-vehicular path of the respective extra-vehicular object to avoid intercepting the other one of the two extra-vehicular objects; and
generating, by the processor, a secondary external communication in response to the extra-vehicular response.

17. The method of claim 10, further comprising:
determining, by the processor, a context based on sensory cues including visual cues or auditory cues from the extra-vehicular objects or an area within a predetermined distance of the vehicle, wherein the visual cues include cues corresponding to weather conditions within the predetermined distance of the vehicle and the external communication is further based on the context.

18. The method of claim 10, further comprising:
determining, by the processor, a geographic location of the vehicle; and
retrieving, by the processor, zoning data corresponding to the geographic location of the vehicle and a predetermined area associated with the geographic location of the vehicle, wherein the external communication is further based on the zoning data.

19. An external communication apparatus comprising:
a sensor configured to detect motion, light, or sound;
a communication component configured to generate external communications; and
a memory and a processor configured to execute instructions stored in the memory to:
  determine a vehicular path for a vehicle and an extra-vehicular path for an extra-vehicular object external to the vehicle, the vehicular path based on vehicle state data including a vehicle velocity and a vehicle orientation, the extra-vehicular path based on extra-vehicular state data including an object velocity and an object orientation of the extra-vehicular object;
  in accordance with determining, based on the vehicle state data and the extra-vehicular state data, that the vehicular path intersects the extra-vehicular path, determine an object identity for the extra-vehicular object and a distance between the vehicle and the extra vehicular object, wherein the object identity is based on the extra-vehicular state data;
  select a communication type based on a determination of whether a display portion of the vehicle is visible to the extra-vehicular object, the display portion being used for displaying external communications directed at the extravehicular object; and
  generate at least one external communication directed at the extra-vehicular object, the at least one external communication generated based on the object identity when the distance between the vehicle and the extra-vehicular object is less than a predetermined threshold distance, wherein the at least one external communication is further generated using the communication type.

20. A non-transitory computer-readable storage medium including program instructions executable by one or more processors that, when executed, cause the one or more processors to perform operations, the operations comprising:
determining a vehicular path for a vehicle and an extra-vehicular path for an extra-vehicular object external to the vehicle, the vehicular path based on vehicle state data including a vehicle velocity and a vehicle orientation, the extra-vehicular path based on extra-vehicular state data including an object velocity and an object orientation of the extra-vehicular object;
in accordance with determining, based on the vehicle state data and the extra-vehicular state data, that the vehicular path intersects the extra-vehicular path, determining an object identity for the extra-vehicular object and a distance between the vehicle and the extra-vehicular object, wherein the object identity is based on the extra-vehicular state data; and
generating at least one external communication directed at the extra-vehicular object, the at least one external communication generated based on the object identity when the distance between the vehicle and the extra-vehicular object is less than a predetermined threshold distance
  wherein the at least one external communication is further generated using a communication type that is determined based on whether a display portion of the vehicle is visible to the extra-vehicular object, the display portion being used for displaying external communications directed at the extravehicular object.

21. A non-transitory computer-readable storage medium including program instructions executable by one or more processors that, when executed, cause the one or more processors to perform operations, the operations comprising:
determining extra-vehicular paths for at least two extra-vehicular objects external to a vehicle, each extra-vehicular path based on extra-vehicular state data including an object identity, an object velocity, and an object orientation for a respective extra-vehicular object;
in accordance with determining, based on the extra-vehicular state data, that two of the extra vehicular paths intersect, determining object identities and a distance between the two extra vehicular objects corresponding to the two extra-vehicular paths that will intersect, wherein the object identities are based on the extra-vehicular state data; and
generating, using at least one communication type, at least one external communication directed at one or more of the at least two extra-vehicular objects, the at least one external communication generated based on the extra vehicular state data when the distance between the two extra-vehicular objects is less than a predetermined threshold distance, wherein the at least one communication type is selected based on whether a display portion of the vehicle is at least partially visible to the one or more of the at least two extra-vehicular objects.

* * * * *

UNITED STATES PATENT AND TRADEMARK OFFICE
CERTIFICATE OF CORRECTION

PATENT NO.        : 10,657,819 B2
APPLICATION NO.   : 15/711705
DATED             : May 19, 2020
INVENTOR(S)       : Kit-Man Wan and Lilli I. Jonsson Page 1 of 1

It is certified that error appears in the above-identified patent and that said Letters Patent is hereby corrected as shown below:

In the Claims

At Column 22, Claim number 1, Line number 37, "extra vehicular" should be --extra-vehicular--.

At Column 22, Claim number 1, Line number 48, "extravehicular" should be --extra-vehicular--.

At Column 24, Claim number 10, Line number 15, "extravehicular" should be --extra-vehicular--.

At Column 24, Claim number 11, Line number 21, "extra vehicular" should be --extra-vehicular--.

At Column 25, Claim number 19, Line number 33, "extra vehicular" should be --extra-vehicular--.

At Column 25, Claim number 19, Line number 39, "extravehicular" should be --extra-vehicular--.

At Column 26, Claim number 20, Line number 24, "extravehicular" should be --extra-vehicular--.

At Column 26, Claim number 21, Line number 37, "extra vehicular" should be --extra-vehicular--.

At Column 26, Claim number 21, Line number 39, "extra vehicular" should be --extra-vehicular--.

At Column 26, Claim number 21, Line number 46, "extra vehicular" should be --extra-vehicular--.

Signed and Sealed this
Twenty-first Day of July, 2020

Andrei Iancu
*Director of the United States Patent and Trademark Office*